United States Patent [19]
Kakuta

[11] Patent Number: 5,583,876
[45] Date of Patent: Dec. 10, 1996

[54] DISK ARRAY DEVICE AND METHOD OF UPDATING ERROR CORRECTION CODES BY COLLECTIVELY WRITING NEW ERROR CORRECTION CODE AT SEQUENTIALLY ACCESSIBLE LOCATIONS

[75] Inventor: Hitoshi Kakuta, Tokyo, Japan

[73] Assignee: Hitachi, Ltd., Tokyo, Japan

[21] Appl. No.: 317,550

[22] Filed: Oct. 4, 1994

[30] Foreign Application Priority Data

Oct. 5, 1993 [JP] Japan .................... 5-273200

[51] Int. Cl.$^6$ ............................ G11C 29/00
[52] U.S. Cl. .............. 371/40.4; 371/51.1; 395/441; 395/497.01
[58] Field of Search .................... 395/425, 575, 395/275, 482, 497.01, 182.04, 441; 371/51.1, 10.1, 40.4

[56] References Cited

U.S. PATENT DOCUMENTS

| | | | |
|---|---|---|---|
| 5,416,915 | 5/1995 | Mattson et al. | 395/425 |
| 5,418,921 | 5/1995 | Cortney et al. | 395/425 |
| 5,418,925 | 5/1995 | DeMoss et al. | 395/425 |
| 5,487,160 | 1/1996 | Bemis | 395/441 |

OTHER PUBLICATIONS

Ousterhout, J. & Douglas, F. Beating the I–O Bottleneck: Case for Log Structured File Systems. Oct. 1988.

Rosenblum, M. & Ousterhout, J. The Design & Implementation of a Log Structured File System. Feb. 1992.

Stodolsky, D. et al. Parity Logging Overcoming the Small Write Problem in Redundant Disk Arrays. May 1993.

Ousterhout, J. & Douglas, F. Log Structured File Systems IEEE Publication; CH2686–4/89/0000/0124.

*Primary Examiner*—Roy N. Envall, Jr.
*Assistant Examiner*—Yoncha Kundupoglu
*Attorney, Agent, or Firm*—Antonelli, Terry, Stout & Kraus

[57] ABSTRACT

When new data for writing is sent from a host device, old data and old parities are read after a search time respectively, and a new parity is generated with the new data, the old data and the old parities, and the new parity is stored in a cache memory, and when the number of the new parities corresponding to a plurality of write data becomes more than a predetermined value set by a user or when there is a period of time in which no read request or no write request is issued, new parities are collectively written to a drive for storing parities. In this case, a plurality of new parities are written in a series of storing positions, where a plurality of old parities are stored, in a predetermined access order independent of the stored positions of corresponding old parities. At least to a plurality of storing positions in a track, these new parities are written in the order of positions in a track. To the storing positions which belong to a different track or to a different cylinder, new parities are written in the order of tracks or cylinders.

27 Claims, 14 Drawing Sheets

FIG. 3

| LOGICAL ADDRESS 27 | INVALIDITY FLAG 28 | DATA DRIVE NO. 29 | INTRA-SCSI ADDRESS 30 | CACHE ADDRESS 31 | CACHE FLAG 32 | PARITY LOGICAL ADDRESS 33 | PARITY DRIVE NO. 34 | PARITY INTRA-SCSI ADDRESS 35 | PARITY CACHE ADDRESS 36 | PARITY CACHE FLAG 37 |
|---|---|---|---|---|---|---|---|---|---|---|
| Data#1 | 0 | SD#1 | DADR1 | — | 0 | Parity#1 | SD#5 | DADR5 | C ADR21 | 1 |
| Data#2 | 0 | SD#2 | DADR1 | C ADR5 | 1 | | | | | |
| Data#3 | 0 | SD#3 | DADR1 | — | 0 | | | | | |
| Data#4 | 0 | SD#4 | DADR1 | C ADR2 | 1 | Parity#2 | SD#5 | DADR7 | — | 0 |
| Data#5 | 1 | SD#1 | DADR2 | — | 0 | | | | | |
| Data#6 | 0 | SD#2 | DADR2 | C ADR6 | 1 | | | | | |
| Data#7 | 0 | SD#3 | DADR2 | C ADR1 | 1 | | | | | |
| Data#8 | 0 | SD#4 | DADR2 | — | 0 | | | | | |
| ...... | ...... | ...... | ...... | ...... | ...... | ...... | ...... | ...... | ...... | ...... |

40

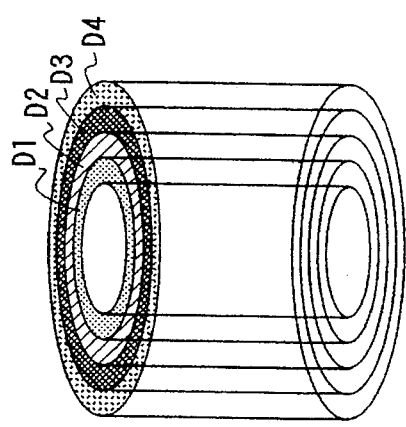
FIG. 9
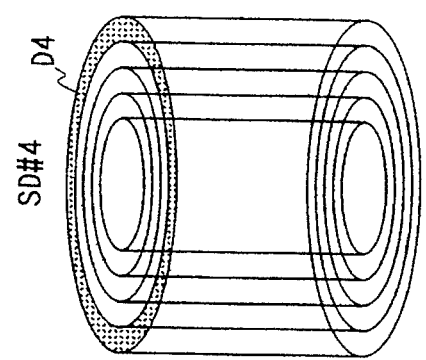
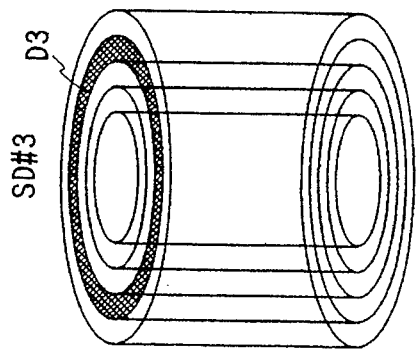
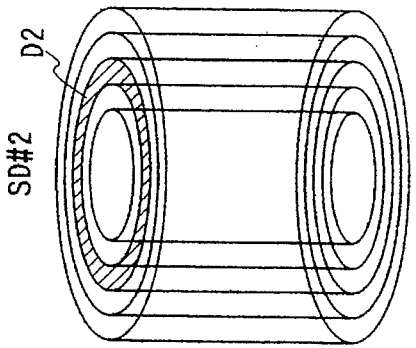
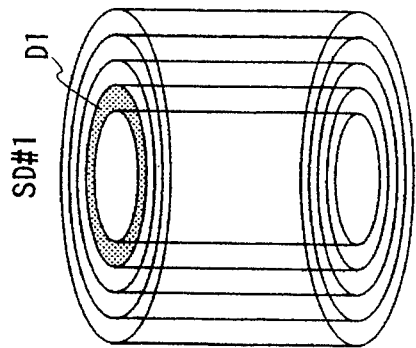
FIG. 10

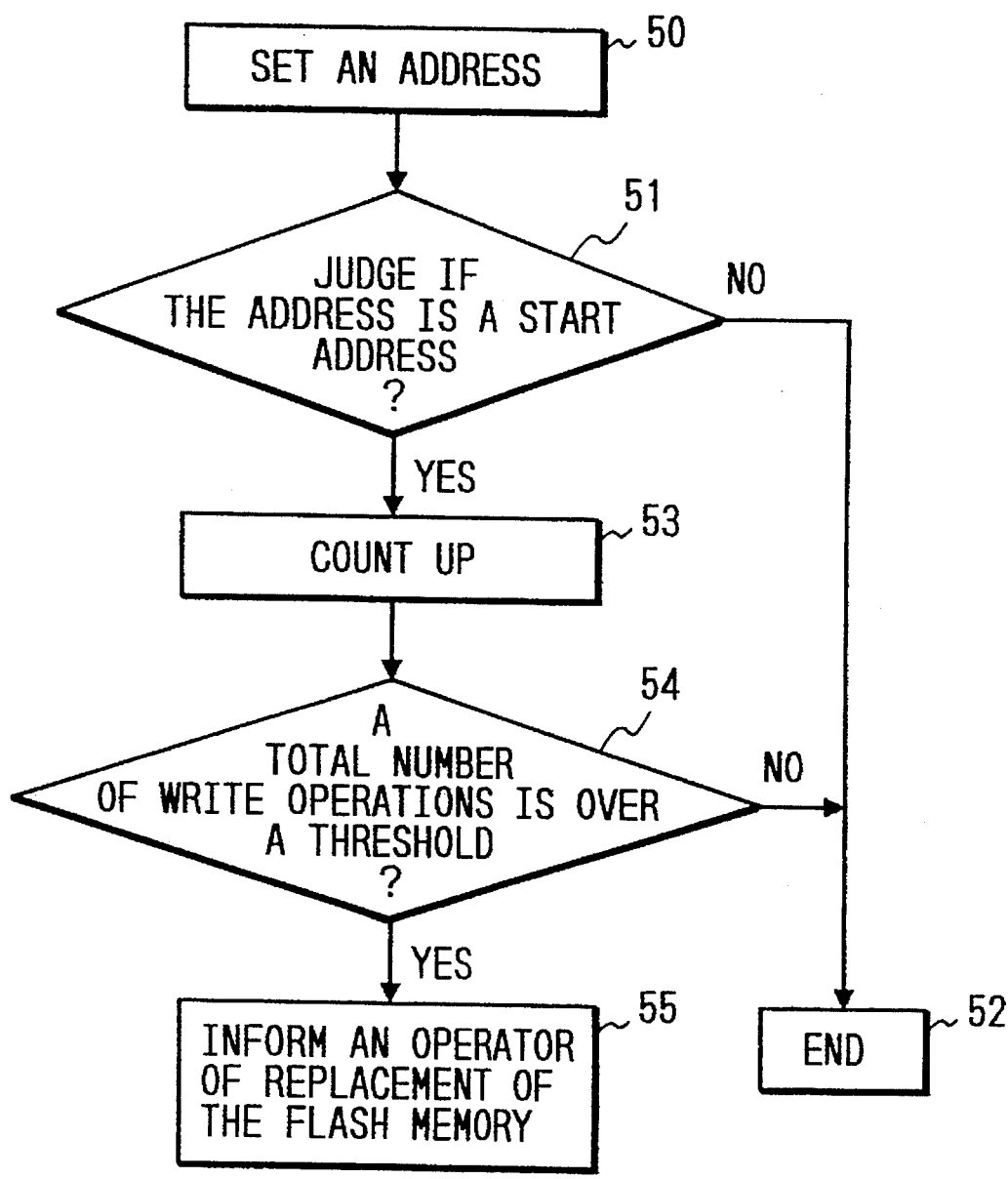

DISK ARRAY DEVICE AND METHOD OF UPDATING ERROR CORRECTION CODES BY COLLECTIVELY WRITING NEW ERROR CORRECTION CODE AT SEQUENTIALLY ACCESSIBLE LOCATIONS

BACKGROUND OF THE INVENTION

The present invention relates to a method of updating error correcting codes and a disk array device which is suitable to the updating method, the disk array device comprising a plurality of disks for holding data and a disk for holding error correcting codes for the data held in the plurality of disks.

In a present day computer system, the data needed by a higher order device, such as a CPU, etc., is stored in a secondary storage, and the CPU, as occasion demands, performs read or write operations for the secondary storage. In general, a nonvolatile storage medium is used for the secondary storage, and as a representative storage, a disk device (hereinafter referred to as a disk drive) or a disk in which a magnetic material or a photo-electromagnetic material is used can be cited.

In recent years, with the advancement of computerization, a secondary storage of higher performance has been required. As a solution, there has been proposed a disk array constituted with a plurality of drives of comparatively small capacity. For example, referenced is made to "A Case for Redundant Arrays of Inexpensive Disks (RAID)" by D. Patterson, G. Gibson, and R. H. Kartz read in ACM SIGMOD Conference, Chicago, Ill., (June, 1988) pp 109 to 116.

In a disk array which is composed of a large number of drives, due to the large number of parts, the probability of occurrence of a failure becomes high. Therefore, for the purpose of increasing the reliability, the use of an error correcting code has been proposed. In other words, an error correcting code is generated from a group of data stored in a plurality of data disks, and the error correcting code is written to a different disk than the plurality of data disks. When a failure occurs in any of the data disks, the data in the failed disk is reconstructed using the data stored in the rest of the normal disks and the error correcting code. A group of data to be used for generating the error correcting code is called an error correcting data group. Parity is mostly used as the scheme for an error correcting code. In the following, parity is used for an error correcting code, except for a case under special circumstances; however, it will be apparent that the present invention is effective in a case where an error correcting code other than one based on parity is used. When parity is used for an error correcting code, the error correcting code data group can be also referred to as a parity group.

The above-mentioned document reports the results of a study concerning the performance and the reliability of a disk array (level 3) in which write data is divided and written to a plurality of drives in parallel, and of a disk array (level 4 and 5) in which data is distributed and handled independently.

In a present day large scale general purpose computer system or the like, in a secondary storage, constituted with disk drives, the addresses of individual units of data which are transferred from a CPU are fixed to predetermined addresses, and when the CPU performs reading or writing of the data, the CPU accesses the fixed addresses. The same thing can be said about a disk array.

In the case of a disk array (level 3) in which data is divided and processed in parallel, the fixing of addresses exerts no influence upon the disk array; however, in the case of a disk array (level 4 and 5) in which data is distributed and handled independently, when the addresses are fixed, a data writing process is followed by a large overhead. About the overhead, an explanation has been given in Japanese Patent Application No. Hei 4-230512; in the following also, the overhead will be explained briefly in the case of a disk array (level 4) in which data is distributed and handled independently.

In FIG. 15A, each address (i,j) is an address for a unit of data which can be processed in read/write operation of one access time.

Parity is constituted by a combination of data composed of 4 groups of data in each address (2,2) in the drives from No. 1 to No. 4, and the parity is stored in a corresponding address (2,2) in the drive No. 5 for storing parity. For example, when the data in the address (2,2) in drive No. 3 is to be updated, at first, the old data before the update in the address (2,2) in drive No. 3 and the old parity in the address (2,2) in the parity drive No. 5 are read (1).

An exclusive-OR operation on the read old data, the old parity, and the updated new data is carried out to generate a new parity (2). After the generation of the new parity is completed, the updated new data is stored in the address (2,2) in the drive No. 3, and the new parity is stored in the address (2,2) in the drive No. 5 (3).

In the case of a disk array of level 5, in order to read out the old data and the old parity from the drive on which data is stored and from the drive on which the parities are stored, disk rotation is delayed by ½ turn on the average, and from the disk the old data and the old parity are read out to generate a new parity.

As shown in FIG. 15B, one turn is needed to write the newly generated parity at the address (2,2) in the drive No. 5. A latency time also is needed to write the new data at the address (2,2) in the drive No. 3. In conclusion, for the rewriting of data, at a minimum, a latency time of 1.5 turns is needed. In the case of the RAID 4, since a plurality of parities for the data in a plurality of parity groups are stored on the same disk, a latency time of one turn needed when a new parity is written causes a degrading of the performance in writing. Even if the write time of new data increases, the data access for the data stored on other disks can be performed independently, in principle, so that the influence of the overhead on the write time of data is smaller in comparison with the overhead involving an update of parity.

In order to reduce the overhead during write time as described above, a dynamic address translation method may be employed, as disclosed in PCT International Application laid open under WO 91/20076, applied by Storage Technology Corporation (hereinafter referred to as STK).

In Japanese Patent Application No. Hei 4-230512, applied for by IBM, there is disclosed a method for reducing the write overhead by writing data at an address other than the address at which the write data is to be written.

On the other hand, in recent years, a flash memory has been suggested as a replacement for the magnetic disk. Since a flash memory is a nonvolatile memory, the reading or writing of data in the flash memory can be performed faster in comparison with that in a magnetic disk. In the case of a flash memory, however, when data is to be written, other data existing at the receiving address has to be erased. In the case of a representative flash memory, the write time or the read time is in the order of 100 ns, similar to the case of the RAID, but it takes about 10 ms for an erase time. Also, there is a limit to the number of times writing may be carried out, and the limit is said to be about one million times, which is regarded as a problem in practical use.

In order to solve the above-mentioned problem concerning the limit in the number of times writing is possible in the case of a flash memory, a method in which address translation is performed during the write time so that the number of writing times to flash memories can be averaged with the use of a mapping table is disclosed by IBM in Japanese Patent Application No. Hei 5-27924.

SUMMARY OF THE INVENTION

In the methods described in the above-referenced patent applications by STK and IBM, the overhead at the time of writing data and new parities can be reduced by use of a dynamic address translation method; however, in order to realize such a technique, the processes for the management of space regions (i.e. regions currently not in use) and used regions on the disk must be increased. Therefore, it is desirable to decrease the write overhead using a simpler method.

An object of the present invention is to offer an error correcting code updating method in which the overhead for a writing process in a disk array can be decreased with a simple method.

Another object of the present invention is to decrease the overhead for a writing process of an error correcting code by storing the error correcting code in a flash memory in a disk array.

In order to achieve these objects, in a desirable mode of operation of a disk array according to the present invention, the following operations are performed: a new correcting code is generated for respective requests for writing issued by a host device, the new error correcting codes are temporarily held in a random access memory, and the new error correcting codes are written in a proper order to a disk being used for correcting codes. In this case, individual new error correcting codes are written at the positions in which a plurality of old error correcting codes were held in the positional access order. The access order of a plurality of storing positions in a track is determined according to the order of the positions in the direction of rotation. To the storing positions in the different tracks or cylinders new correcting codes are written in a proper order, for example, in the order of the tracks or in the order of the cylinders.

Thereby, it is possible to write a plurality of new error correcting codes in a short time.

In another desirable mode of operation of a disk array according to the present invention, the following operations are performed: before the groups of new error correcting codes arranged in a sequential order are written to a drive for error correcting codes, a plurality of effective error correcting codes which do not need updating, because no write request is issued for them, are read from the error correcting disk in order, the read error correcting codes which do not need updating are held in a flash memory together with the above-mentioned new error correcting codes, and the series of error correcting codes are written onto the disk for error correcting codes.

In a further desirable mode of operation according to the present invention, a flash memory which has a short access time is used in place of a disk for storing error correcting codes, and a series of new error correcting codes are written to the flash memory according to one of the collective-writing procedures of error correcting codes as described above.

BRIEF DESCRIPTION OF THE DRAWINGS

FIG. 3 is a chart showing the details of the address translation table (40) to be used for the device shown in FIG. 1.

FIG. 9 is an illustrative diagram for explaining region division in the parity drive in the embodiment 3.

FIG. 10 is an illustrative diagram showing the regions for parities distributed in a plurality of data drives in the embodiment 4.

FIG. 14 is a flowchart for judging the number of writing times in the flash memory used in the embodiment 8.

DESCRIPTION OF EMBODIMENTS (Embodiment 1)

Figure 1:
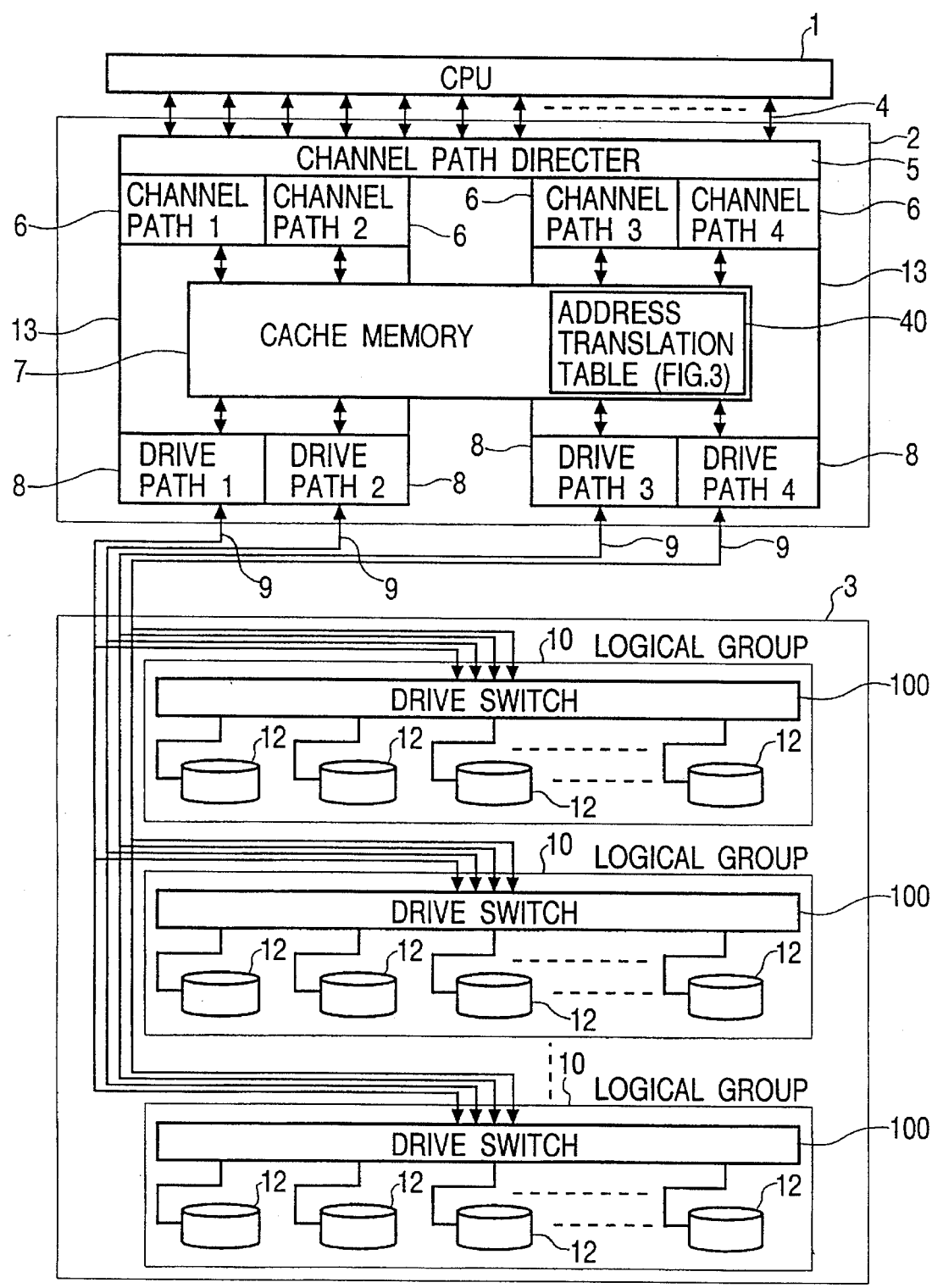
FIG. 1 is a schematic diagram showing the hardware constitution of the embodiment 1.

FIG. 1 shows a first embodiment of a disk array system according to the present invention. The constitution itself of the device is known to the public, and the present invention is characterized in the procedure for the collective storage of a plurality of new parities generated for a plurality of data writing requests in a drive for parities, so that the constitution of the device will be explained briefly to the extent necessary for understanding the characteristic features of the invention.

A disk array system is composed of a disk array controller 2 and a disk array unit 3 which are connected to a host device, CPU 1, by way of a path 4. The disk array unit 3 is composed of a plurality of logical groups 10. As explained later, the disk array system in the present embodiment is arranged to be able to access four drives in parallel. Following the above, each logical group 10 in the present embodiment is composed of four drives 12; however, in general, the logical group 10 may be composed of m drives (m: an integer larger than 2). These drives are connected to four disk array unit paths 9 by a drive switch 100. There is no special limit in the number of the drives 12 which constitute each logical group. It is assumed in the present invention that each logical group 10 is a failure reconstruction unit, and a plurality of drives 12 in a logical group 10 are composed of three drives for data and a drive for holding parities generated from the data in the drives.

The disk array controller 2 comprises a channel path director 5, two clusters 13, and a cache memory 7. The cache memory 7 is constituted by semiconductor memories which are made to be nonvolatile by a battery backup, etc. There are stored in the cache memory 7, data to be written to any one of the drives, or data read from any one of the drives, and an address translation table 40 which is used for the access to each of the drives in the disk array. The cache memory 7 and the address translation table 40 are used in common by all clusters 13 in the disk array controller 2.

The cluster 13 provides a gathering of paths which can be operated independently from each other in the disk array controller 2, and each cluster has its own power supply and circuit, which are independent from those of other clusters.

The cluster 13 is constituted with two channel paths 6 and two drive paths 8; there are four channel paths between the channel path director and the cache memory 7, and there are also four drive paths between the cache memory 7 and drives 12. Two channel paths 6 and two drive paths 8 are connected through the cache memory 7.

Figure 2:
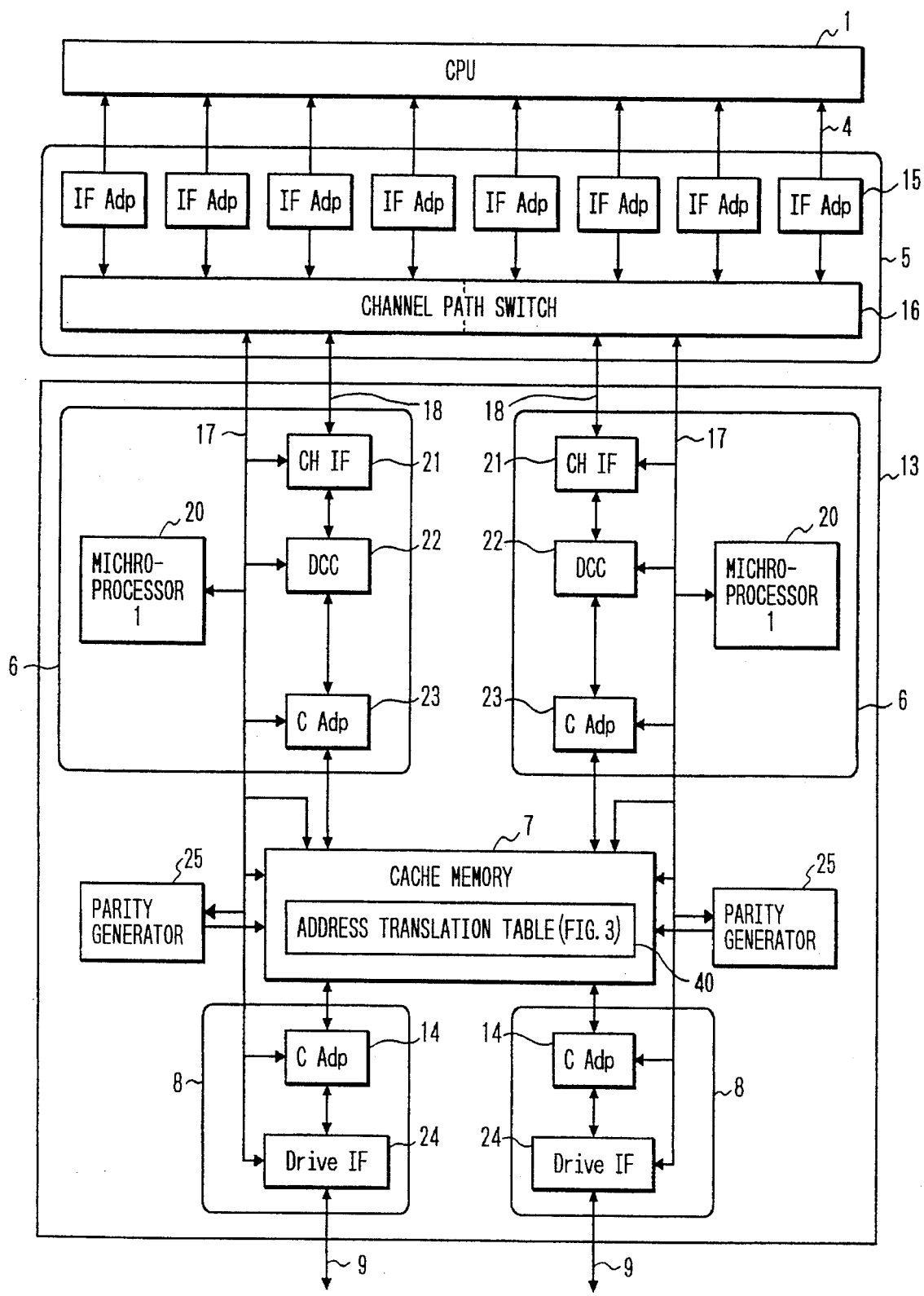
FIG. 2 is a schematic block diagram showing the internal constitution of the channel path director (5) and the cluster (13) shown in FIG. 1.

FIG. 2 shows the internal constitution of the channel path director 5 and a cluster 13.

As shown in FIG. 2, the channel path director 5 is constituted with a plurality of interface adapters 15 which receive the commands from the CPU 1 and a channel path switch 16.

Each of the two channel paths 6 in each cluster 13 is composed of a circuit for transferring commands and a circuit for transferring data. The former is composed of a microprocessor (MP) 20 for processing the commands from the CPU 1, a channel director 5, and a path 17 for transferring commands being connected to the microprocessor 20, etc. The latter is composed of a channel interface circuit (CH IF) 21, which is connected to the channel path switch 16 by line 18, and which takes charge of the interface with the channel director 5, a data control circuit (DCC) 22, which controls the transfer of data, and a cache adapter circuit (C Adp) 23. The cache adapter circuit 23 performs reading of data or writing of data for the cache memory 7 under command of the microprocessor 20, and also it performs monitoring of the condition of the cache memory 7 and exclusive control for the write requests and read requests.

Each of the two drive paths 8 in each cluster 13 is composed of a cache adapter circuit 14 and a drive interface circuit 24. The latter is connected to each logic group 10 through one of the four disk array unit paths 9.

Further in each cluster 13, there are contained two parity generator circuits 25, which are connected to the cache memory 7.

(Address translation table 40)

In the present embodiment, it is assumed that the path 9 is constituted as a SCSI path.

Further, in the present embodiment, a plurality of the drives 12 are used as data drives, except for one drive, in the logic groups 10, and the one drive is exclusively used for a specified parity, such as RAID 4.

Each drive comprises a plurality of disks and a plurality of heads which are provided corresponding to the disks, and tracks which belong to different disks are divided into a plurality of cylinders, and a plurality of tracks which belong to a cylinder are disposed to be accessible in order.

The CPU 1, by means of a read command or a write command, designates the data name as a logical address of the data which is to be dealt with by the command. In the present embodiment, the length of data designated with a write command from the CPU 1 is assumed to have a fixed length. The logical address is translated to an Addr in a physical address SCSI in one of the actual drives 12 by either of the microprocessors 20 in the disk controller 2.

To be more specific, the Addr in the SCSI comprises: the number of a drive in which request data is stored, the cylinder address, the number of a cylinder in the above-mentioned drive 12, a head address, the number of a head which selects a track in a cylinder, and a record address which expresses the position of data in a track.

As shown in the following, a table 40, hereinafter referred to as an address table (FIG. 3), is used for the address translation. The table 40 is stored in the cache memory 7.

The address table 40 holds the address information for individual parity groups held by all logical groups in the disk array. In other words, the address table 40 holds the address information about a plurality of units of data which constitute each parity group and the address information about parities of the parity group as a set.

The address table 40 holds for each unit of data in one of the parity groups: a logical address 27 of the data, a nullifying flag 28 which is turned ON (1) when the data is invalid, the number of a data drive 29 (D Drive No.) in which the data is stored, the Addr 30 in the SCSI which expresses a physical address in the drive in which the data is actually stored, a cache address 31 which expresses the address in the cache memory 7 when the data is present in the cache memory 7, and a cache flag 32 which is turned ON (1) when the data is present in the cache memory 7. In the present embodiment, it is assumed that a plurality of units of data which belong to the same parity group are held in the Addr 30 in the same SCSI in each drive 12 which constitutes one of the logical groups 10.

Further, the table 40 comprises for the parity group: a P logical address 33 which is a logical address of a parity of the parity group, the number of a drive (parity drive) 34 (P Drive No.) in which the parity is stored, an Addr 35 in the PSCSI which is a physical address in the parity drive in which the parity is actually stored, a P cache address 36 which shows the stored position of the parity when the parity is stored in the cache memory 7, and a P cache flag 37 which shows the existence of the parity in the cache memory 7.

When the power supply is turned ON, the address table 40 is read automatically, with no sensing of the CPU 1, into the cache memory 7 from a specified drive in the logical group 10 by either microprocessor 20. On the other hand, when the power supply is turned OFF, the address table 40 stored in the cache memory 7 is automatically stored back into a predetermined position in the specified drive.

(Writing process)

A writing process includes the following: the updating of data in which a user designates a logical address to which the data is to be written and rewrites the data, and new writing of data in a space region. In the present embodiment, for simplification, a writing process for the update of data will be explained with reference to FIG. 4 to FIG. 7.

When a write request is issued from the CPU 1, the following operation is executed under the control of either of the microprocessors 20.

A logical address and new data for writing, which are transferred from the CPU 1, are stored in the cache memory 7 through a cache adapter circuit 23. The address in the cache memory at which the data is stored is registered in a cache address 31 in the address table 40 which corresponds to the logical address of the data.

At this time, a cache flag 32 which corresponds to the logical address 27 is turned ON (1).

When a further write request is issued from the CPU 1 for the new data held in the cache memory 7, the new data is rewritten.

Either of the microprocessors 20, which receives the write request, recognizes drives 12 (designated by the data drive No. field 29 and the parity drive No. field 34 of the address translation table 40 shown in FIG. 3) in which the data and parities are stored, and Addr 30 in the SCSI and Addr 35 in the PSCSI, the physical address of the drive 12, from the logical address designated by the CPU 1, by referring to the address table 40.

Figure 4:
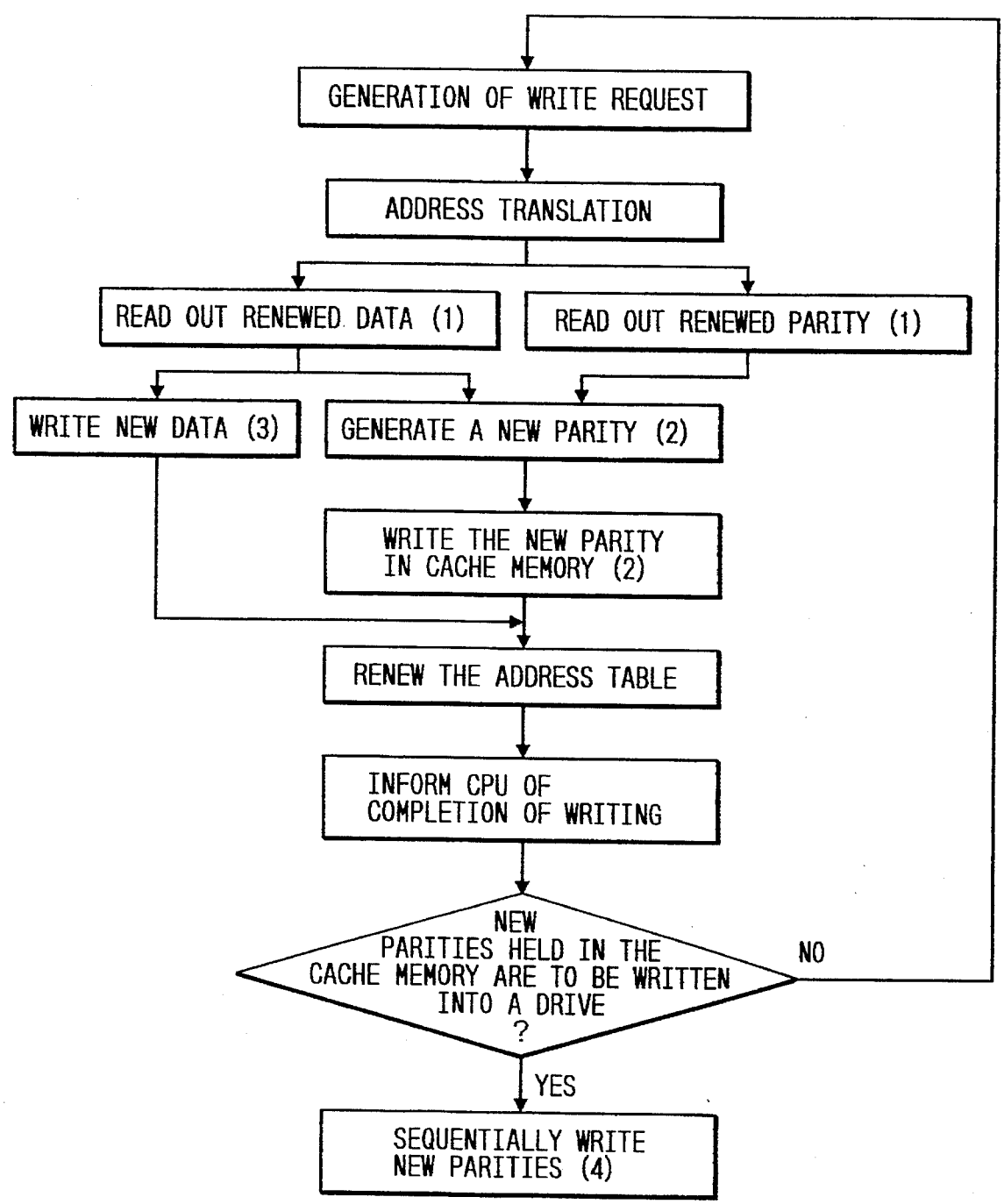
FIG. 4 is a flowchart of a data writing process and a parity updating process in the embodiment 1.
Figure 5:
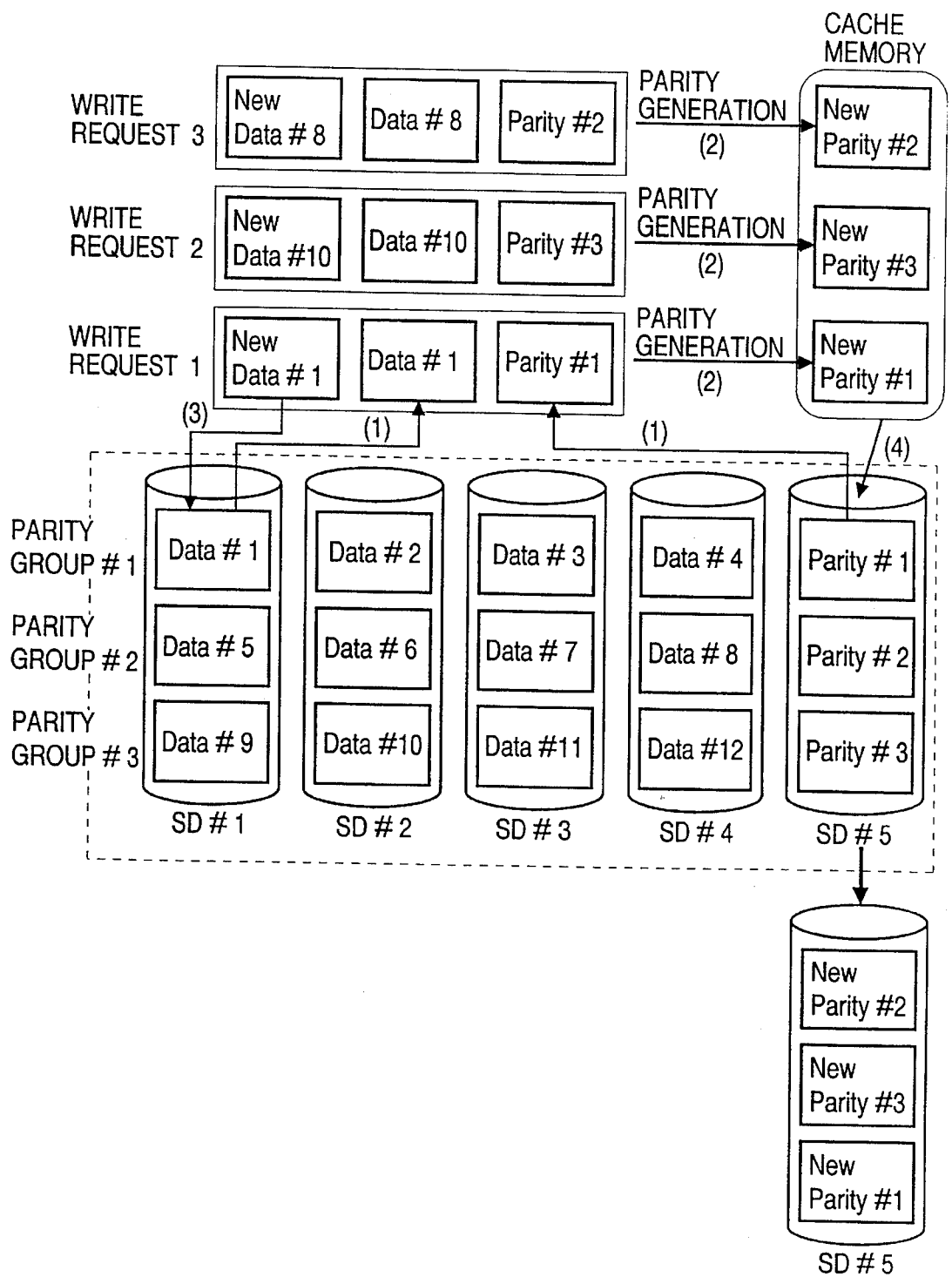
FIG. 5 is a conceptional illustrative representation of the data writing process and the parity updating process in the embodiment 1.

As shown in FIG. 5, when a write request is issued from the CPU 1 for the Data No. 1 in the drive 12 of SD No. 1 to update the data to a New Data No. 1, the microprocessor 20, after recognizing the physical addresses of Data No. 1, the data to be updated (old data), and of parity No. 1, the parity to be updated (old parity), by referring to the address table 40, reads out the old data and the old parity from respective drives (step 1 in FIG. 4 and FIG. 5). The read out old data and old parity are stored in the cache memory 7.

An exclusive-OR operation is performed on the old data and the old parity, and new data to be written, to generate a New Parity No. 1, a new parity after updating, and the new parity is stored in the cache memory 7 (step (2) in FIGS. 4 and 5).

After the completion of storing of the new parity (New Parity No. 1) into the cache memory 7, the microprocessor 20 writes new data (New Data No. 1) in the address of Data No. 1 in the drive 12 in SD No. 1 (step (3) in FIGS. 4 and 5). The writing of the new data can be performed asynchronously under the control of the microprocessor 20.

The characteristic of the present invention is that a new parity (New Parity No. 1) is not immediately written in the parity drive SD No. 5, but is put together with other new parities corresponding to other write requests and they are written en bloc in the parity drive.

In the case where New Data No. 1 is registered in an entry having a logical address of Data No. 1 for the address table 40 and the data is held in the cache memory 7, the address in the cache memory 7 is registered in the cache address 31, and the cache flag 32 is turned ON. About parity, the cache address is registered in the Pcache address 36, and the Pcache flag 37 is turned ON.

As described above, in the address table 40, a parity whose Pcache flag is in the ON state is classified to be an updated parity, and a parity stored in a drive for storing parity is regarded to be invalid thereafter.

Figure 6:
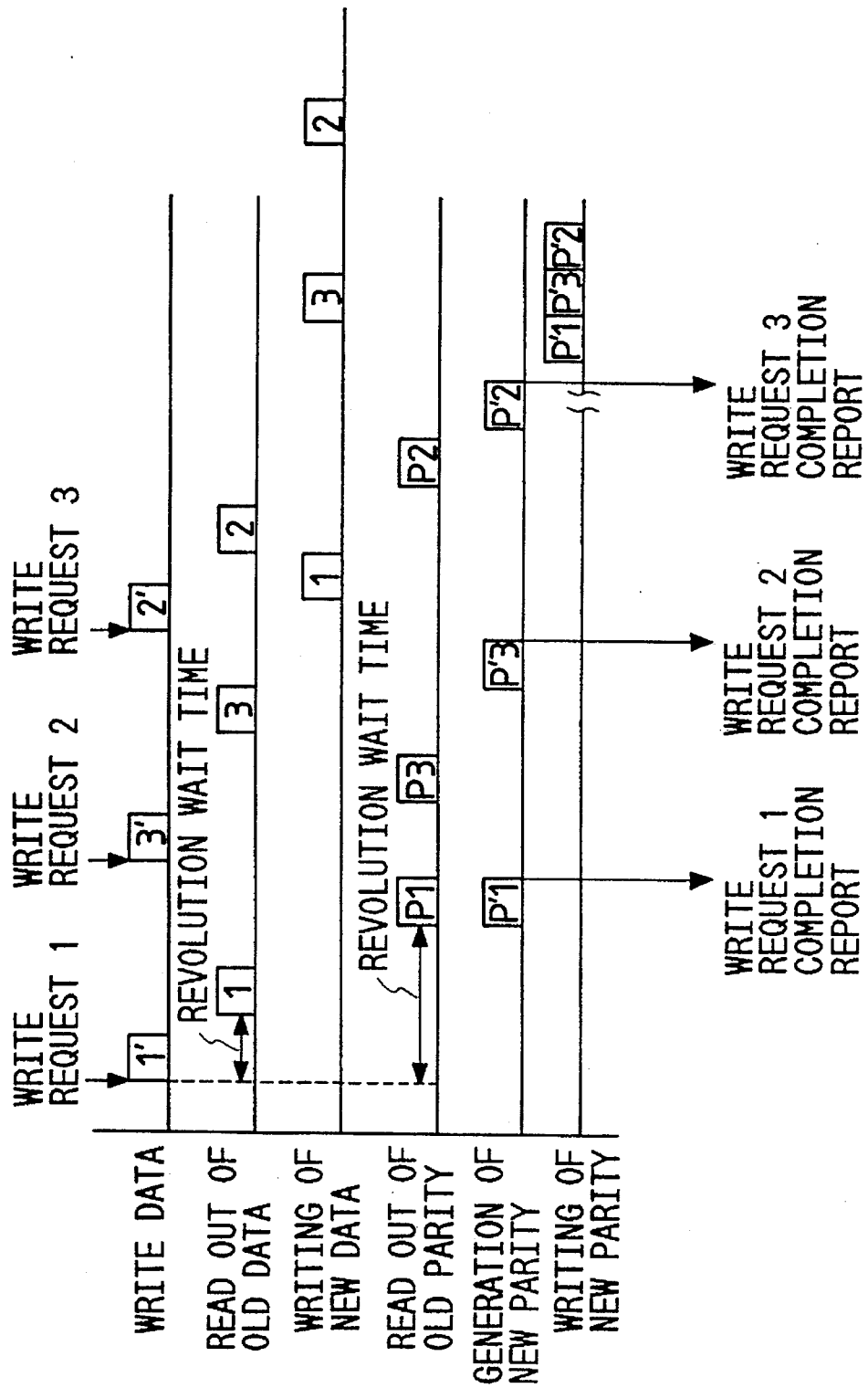
FIG. 6 is a timing chart of the writing process in the embodiment 1.

In the present embodiment, as shown in FIG. 6, when the new data and the new parity from the CPU 1 are stored in the cache memory 7, the microprocessor 20 reports to the CPU 1 that the process of writing the data is finished.

In a conventional method, after a new parity is written in a parity drive with a delay of one turn, the microprocessor 20 reports to the CPU 1 that the writing process is finished.

The writing of a new parity into the parity drive No. 5 is performed asynchronously under the control of the microprocessor 20, so that it cannot be seen by a user.

When the writing of a new data into the data drive No. 1 is performed asynchronously under the control of the microprocessor 20, the completion of the writing is not seen by a user.

Following the above, when a write request for other data, for example, Data No. 10 and Data No. 8 stored in data drives SD No. 2 and SD No. 4 is issued, these requests are processed in the same way as described above, and new data corresponding to the above-mentioned data is written in a data drive and new parities corresponding to them are stored in the cache memory 7.

When a number of the new parities collected in the cache memory 7 exceeds a preset value set by a user, or when there is a period of time in which no read/write request is issued from the CPU 1, these new parities are written collectively in order into a parity drive SD No. 5 using a method to be explained later (step (4) in FIGS. 3 and 4).

After such writing process is finished, Addr in SCSI in which new parities are actually written are registered in the Addr 35 in the PSCSI in the address table 40.

(Collective writing of a plurality of new parities)

In the present embodiment, a plurality of new parities held in the cache memory 7 are written into a parity drive in a sequential order. The positions in the parity drive into which individual new parities are written are different from the case of a conventional technique, wherein new parities are written in the positions where the old parities corresponding to new parities were held. In this regard, in the present embodiment, new parities are written into the positions determined by the order of access among a plurality of storage positions in which a plurality of old parities were held.

The order of access is determined such that a plurality of storing positions which belong to a track are accessed in the order of the storage positions in the direction of rotation.

In the present embodiment, a plurality of new parities held in the cache memory are written into a parity drive in the order of occurrence of the write requests which have caused the new parities to be generated.

To be more specific, a detailed explanation will be given in the following.

(1) In finding a plurality of tracks to which the old parities corresponding to the new parities belong, a group of the new parities held in the cache memory 7 are written in order into the positions of old parities according to the predetermined cylinder order and track order. In such case, to the positions of a plurality of old parities in a track, new parities are written in order following the order of the storage positions in the track.

Figure 7:
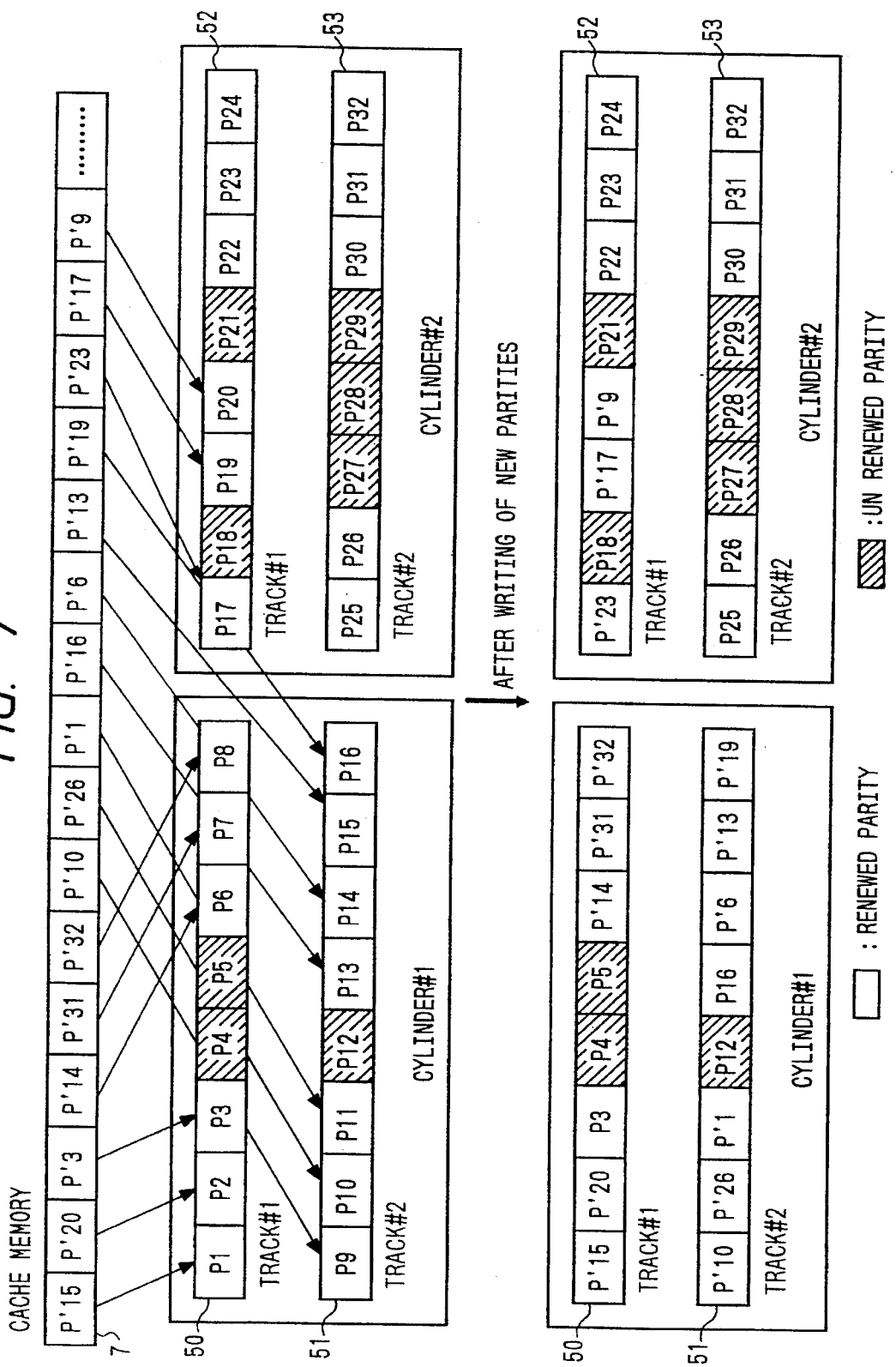
FIG. 7 is an illustrative diagram for explaining a sequential writing method of new parities in the embodiment 1.

For example, in FIG. 7, there is shown a state where a group of old parities in the track 50 (No. 1) and track 51 (No. 2) in the cylinder No. 1, and in the track 52 (No. 1) and track 53 (No. 2) in the cylinder No. 2 are rewritten to a group of new parities in the cache memory 7. In this case, it is assumed that a new parity group, P'15, P'20, P'3, P'14,P'31, P'32,
P'10, P'26, P'1, P'16, P'6, P'13, P'19,
P'23, P'17, P'9, P'22, P'23, P'24,
P'25, P'26, P'30, P'31, P'32, is generated in this order, and a group of old parities corresponding to the new parities belong to tracks No. 1 and No. 2 in each of the cylinders No. 1 and No. 2.

These new parities are written in order from the top into the position of an old parity in the track No. 1 in the cylinder No. 1, and then the new parities are written into the positions of old parities in the order of storage positions in the track. In this case, new parities, P'15, P'20, P'3, P'14, P'31, and P'32, are written in the positions of old parities, P1, P2, P3, P6, P7, and P8. It is possible to finish the writing process as described in the above in a single turn of a parity drive.

(2) A part of the rest of the new parities are written in a predetermined next track in the same cylinder No. 1, in this case, they are written in the track No. 2.

In the example shown in FIG. 7, new parities, P'10, P'26, P'1, P'16, P'6, P'13, and P'19, are written in the track No. 2 in a sequential order.

(3) A part of the rest of the new parities are written in the next cylinder, in this example, in a track in the No. 2 cylinder, in this case, at a position in the track No. 1.

In the example shown in FIG. 7, new parities P'23, P'17, P'9, P'22, P'23, and P'24, are written in the track No. 1 in order.

(4) A part of the rest of the new parities are written in the same way into the next track in the same cylinder, in this case, in the track No. 2.

In the example shown in FIG. 7, new parities, P'25, P'26, P'30, P'31, and P'32, are written in the track No. 2 in order.

In the way described above, a group of new parities can be written in a short search time into a group of storing positions to which a group of old parities belong.

In a conventional method, the Addr 35 in the PSCSI for storing parities in a parity drive is made to be identical with the Addr 30 in the SCSI for storing data in the drive 12 for storing data. In the present embodiment, however, a plurality of new parities are written in different positions from the storing positions of the corresponding old parities, that is, they are written in the storing positions of the old parities in the access order of the positions; thereby a plurality of new parities can be written in a short time.

As described above, when parities are written sequentially, after a parity has been written, in order to prevent a block which is necessary for writing the next parity to be passed by while a process to start the writing of the next parity is performed, it is necessary to have enough of a sector gap available (On this point, refer to, for example, "Transistor Technology, Special No. 27" CQ Publishing Co., 1, May, 1991, p 20.).

In a case where a new write request is issued from the CPU 1 while new parities collected in the cache memory 7 are being written sequentially, collectively, the above-mentioned writing process is continued and after the writing process is finished, the new write request is processed.

(Reading process)

The reading process is basically the same as the method known to the public. When a read request issued from the C2U 1 is processed, similar to the case where a write request is processed, a logical address designated by the request is translated to a physical address and the desired data is read from one of the data drives, and the read data is transferred to the CPU 1. Provided that, when the data is held in the cache memory 7, the data is transferred from the cache memory 7 to the CPU 1.

(Failure reconstruction process)

When a failure occurs in one of the drives, a method for reconstructing the data in the failed drive will be explained.

For example, as shown in FIG. 5, it is assumed that a Parity No. 1 in a drive 12 in SD No. 5 is composed of Data No. 1 in a drive 12 in SD No. 1, Data No. 2 in a drive 12 in SD No. 2, Data No. 3 in a drive 12 in SD No. 3, and Data No. 4 in a drive 12 in SD No. 4. In the same way, it is assumed that Parity No. 2 is composed of Data Nos. 5, 6, 7 and 8, and Parity No. 3 is composed of Data Nos. 9, 10, 11 and 12.

When a failure occurs at any one of the drives SD Nos. 1, 2, 3 and 4, for example, at SD No. 1, all the data in the failed drive SD No. 1 can be reconstructed from the data in the rest of the drives, SD No. 2. SD No. 3, and SD No. 4 and a parity in the drive No. 5.

In accordance with the present invention, in the result of the collective writing of the plurality of parities, in general, the addresses in the drives SD No. 1 to SD No. 4 of a plurality of units of data which belong to the same parity group do not coincide with the addresses of parities in the parity group in the parity drive SD No. 5.

Therefore, when the data in the failed drive SD No. 1 is to be reconstructed, either of the microprocessors 20 reads out all parities in the parity drive SD No. 5 in the cache memory 7. In that case, the microprocessor 20 registers the addresses in the cache memory 7, which stores the read out parities to the Pcache address 36 in the address table 40, and turns the Pcache flag 37 ON.

Next, the microprocessor 20 reads out three units of normal data which belong to one of the parity groups in drives 12 in SD Nos. 2, 3 and 4, for example, Data No. 2, Data No. 3 and Data No. 4, in order and searches the cache address for a parity which belongs to the same parity group with these units of data from the address table 40. A parity designated by the located address, and the above-mentioned three units of normal data are sent to a parity generating circuit (PG) 25 (FIG. 1) and a unit of data in the failed drive SD No. 1 which belongs to the parity group, for example, Data No. 1 is reconstructed. In the same way, other units of data in the failed drive SD No. 1, for example, Data Nos. 5, 9, etc. are reconstructed.

After the failed drive SD No. 1 is replaced by a normal drive, the reconstructed data is written to the normal drive; thus, the reconstruction process is completed.

In a case where a standby normal drive is provided beforehand for the occurrence of a failure in the drives Nos. 1 to 5, the reconstructed data is written in the standby normal drive.

In the present embodiment, data, except for parity, which belongs to one parity group is held at the same address in different data drives, but the address of a parity in a parity drive differs from that in the former. When a failure occurs in one of the data drives, the parity data which corresponds to the data in a different parity group read from respective data drives in order have to be read from a random position of a parity drive. In the present embodiment, in place of a random reading, it is arranged that all parities are read from parity drives and stored in the cache memory 7, and the parities which correspond to respective parity groups read from a plurality of data drives are utilized by retrieving them from the cache memory 7. Thereby, when a failure is to be reconstructed, the utilization of parities can be performed at a high speed.

(Modification of Embodiment 1)

In the above explanation, the cache memory 7 which stores updated new parities is assumed to be a nonvolatile semiconductor memory. However, a parity, different from data, can be reconstructed even if it is erased by an interruption of electricity or other factors, so that if the overhead for regenerating parity is permitted, it is possible to constitute a region for storing old parities in the cache memory 7 with a volatile semiconductor memory.

In the above explanation, updated new parities are stored in the cache memory 7; however, it is also possible to provide an exclusively used memory for storing them.

(Embodiment 2)

Figure 8:
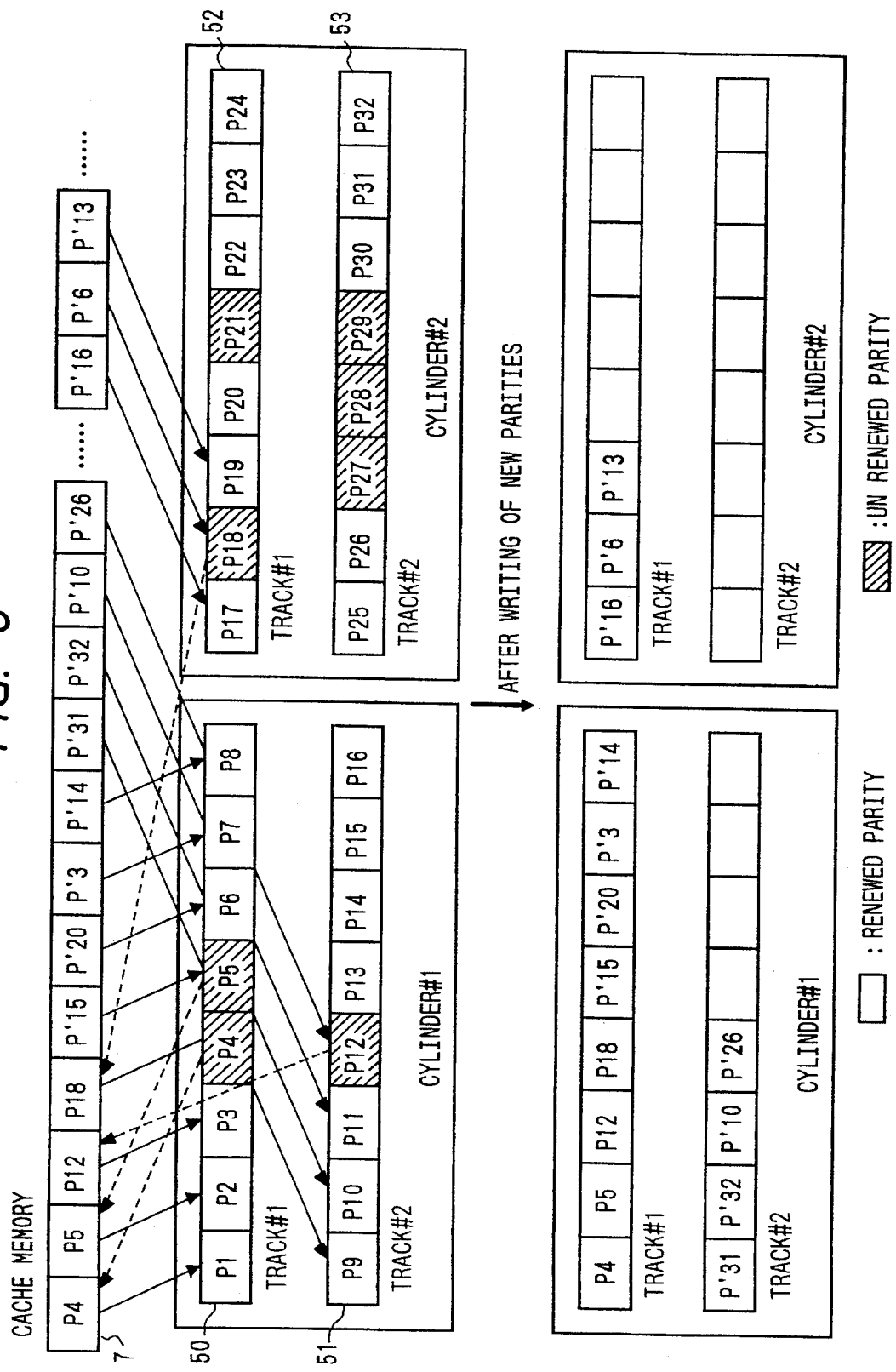
FIG. 8 is an illustrative diagram for explaining a sequential writing method of new parities in the embodiment 2.
Figure 11:
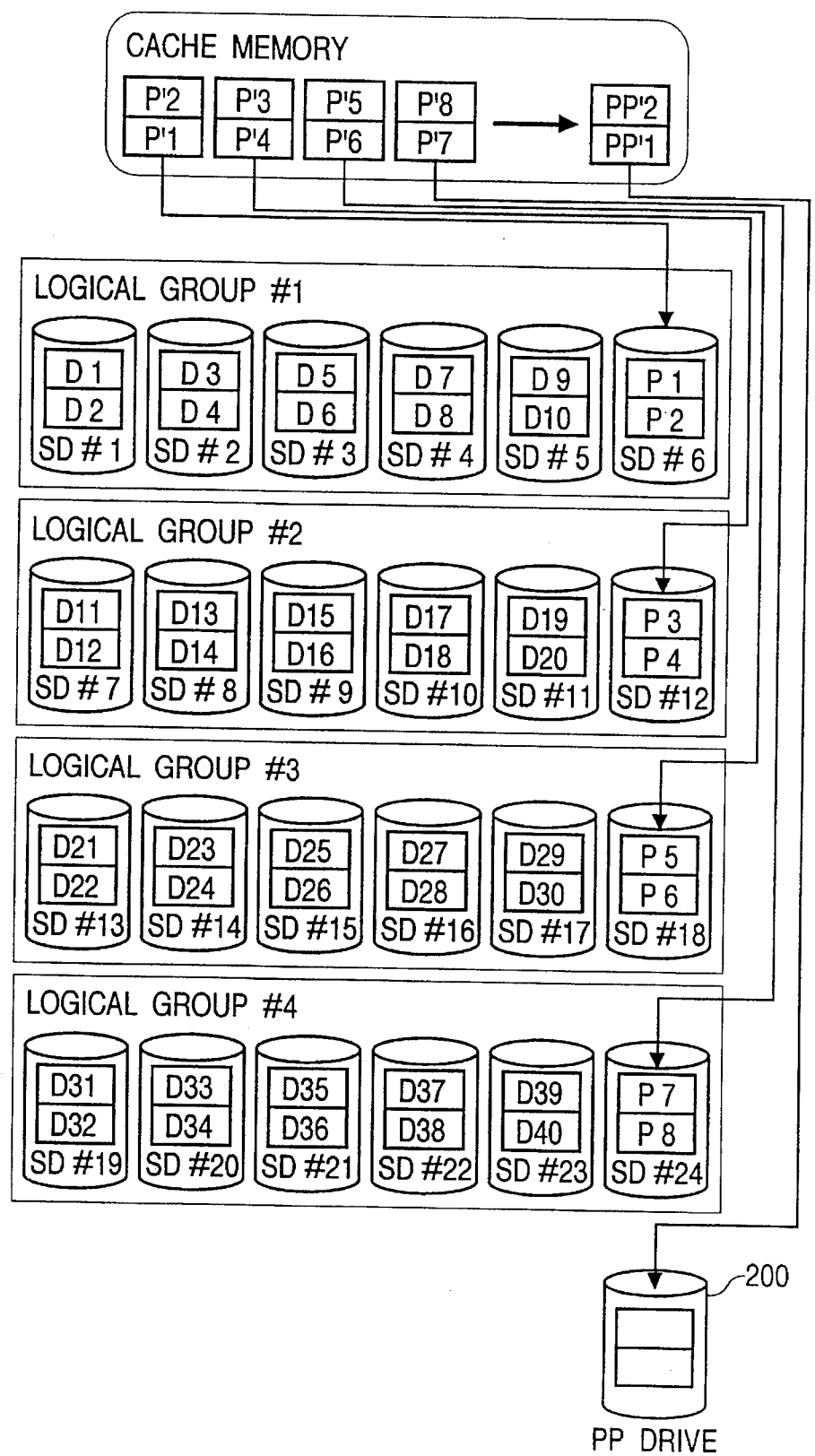
FIG. 11 is a schematic block diagram for explaining the constitution of a device and the writing process in it in the embodiment 5.

There is another method of collective writing of a plurality of new parities in accordance with the present invention. As shown in FIG. 8, effective parities P8 and P9, which are not to be updated by a write request, are read in the cache memory 7 in response to an instruction from the microprocessor 20, and according to the read parity, the microprocessor 20 sets the Pcache address 36 in the address table 40 and turns the Pcache flag 37 ON; thereby, the above-mentioned effective parities are regarded to be new parities to be updated, and they can be put together with the other new parities for sequential, collective-writing.

For example, as shown in FIG. 8, a group of new parities, as explained with reference to FIG. 7, are held in the cache memory 7, and after that old parities P4, P5, P12, P18, etc. for which there are no write requests and for which originally there was no need for an update, are regarded to be a parity group to be updated and they are held in the cache memory 7. The parity group which is held in the cache memory 7, as described above is written in order into a track to which the new parities belong. In the example shown in FIG. 8, following the parity groups P4, P5, P12, and so on, which did not need rewriting originally, there are generated new parity groups, P'15 and so on, which are written in order into the track No. 1 and track No. 2 in the cylinder No. 1 and then into the track No. 1 and track No. 2 in the next cylinder No. 2.

In the embodiment 2, there is a need for a surplus process in that the parities which do not need updating originally have to be read from a drive; however, as opposed to the embodiment 1, the read out parities and the generated new parities can be written collectively into respective tracks in order, so that the write control becomes simpler than that in the embodiment 1. The method shown in the present embodiment, in the same way as the method in the embodiment 1, can be applied to any of the following embodiments.

(Embodiment 3)

In the present embodiment, as shown in FIG. 9, a parity drive is divided into a plurality of regions, and the collective-writing of parities as described in the above is performed by the units of regions.

The dividing of a region is performed by the Addr 30 in the SCSI.

For example, the Addr 30 in the SCSI designates a plurality of cylinders which belong to a group of cylinders, from one cylinder to another cylinder, to be a region D1.

In the drives 12 in the SD Nos. 1, 2, 3 and 4, the Addr 30 in the SCSI designates that the parity corresponding to the parity groups which belong to these cylinders, that is, the Addr 36 in the PSCSI of the drive 12 in the SD No. 5, is stored in a region to which these cylinders belong.

As described above, in the address table 40, the region to which the parity belongs and the region to which the data belong are made to correspond to each other.

In a case where such dividing of a region is executed, when the updating of a parity which belongs to the region D1 is performed by a data write request, the new parity is held in the cache memory 7 as a parity in the region D1.

In the same way, new parities generated by other write requests from the CPU 1 are held in the cache memory 7, and the new parities which are held as parities in the region D1 are written into the region D1 sequentially, and collectively.

For the other regions D2, D3 and D4, in the same way as described above, new parities which belong to respective regions are written sequentially, and collectively, into respective regions using the method described with reference to the embodiments 1 or 2.

In the present embodiment, when reconstruction of data for a failed drive is to be performed, the same process as that in the embodiment 1 can be performed in each parity group to which parities in each parity region belong. In other words, all parities in each parity region are read in the cache memory 7, and then the reconstruction of data in the parity group to which the parities belong can be performed. The same process will be performed in order for different regions.

As a result, in the present embodiment, when a failure is reconstructed, the total quantity of parities to be read in the cache memory 7 is smaller than those in the embodiment 1.

(Embodiment 4)

In the present embodiment, as shown in FIG. 10, the function of a drive for the regions D1, D2, D3 and D4 to which parities are written is not limited to the function of one drive which is used exclusively for parities, but the function can be distributed to a plurality of drives SD No. 1 to SD No. 4, which constitute a logical group 10. The other points except the above are the same as in the case of the embodiment 3.

(Embodiment 5)

In the present embodiment, when a failure occurs in any of the parity drives, it is possible to expedite the reconstruction of a parity in the failed parity drive utilizing the collective-writing described with reference to the embodiment 1.

In other words, the collective-writing of parities described in the embodiment 1 is executed in parallel in a plurality of parity drives contained in different logical groups, and further, in parallel to the above operation, a different parity is generated from the parities in these parity drives and is written into the other parity drive, which is provided in common to the other parity drives. When a failure occurs in any of the plurality of parity drives, the parity in the failed parity drive is reconstructed using the new parity and normal parities in the parity drives. Heretofore, to reconstruct a failed parity drive, data has been read from all data drives in a logical group to which the parity drive belongs, and new parities have been generated from them. In the present embodiment, a failed parity drive can be reconstructed faster than in the conventional case.

To be more specific, in the logical group No. 1 shown in FIG. 9, updated new parities P'1, P'2, . . . , corresponding to parities P1, P2, . . . , are held in the cache memory 7 in this order using the method described with reference to the embodiment 1. Similar to the above, in the logical group No. 2, updated new parities P'4, P'3, . . . , corresponding to parities P3, P4, . . . , are held in this order in the cache memory 7. Similar to the above, in the logical group No. 3, updated new parities P'6, P'5, . . . , corresponding to parities P6, P5, . . . , are held in the cache memory 7 in this order. Similar to the above, in the logical group No. 4, updated new parities P'7, P'8, . . . , corresponding to parities, P7, P8, . . . , are held in the cache memory 7 in this order. These new parities are written in order to respective drives SD No. 6, SD No. 12, SD No. 18 and SD No. 24 similar to the case of the embodiment 1.

In the present embodiment, a new parity PP'1 is generated from the new parities P'1, P'4, P'6 and P'7 in the logical groups No. 1 to No. 4. Similar to the above, new parity PP'2 is generated from P'2, P'3, P'5 and P'8. These new parities are stored in another drive 200 which is provided in common to these logical groups. When a failure occurs in any of the parity drives SD No. 6, SD No. 12, SD No. 18 or SD No. 24, a parity in the failed drive is found from the rest of the normal drives and a common drive 200; thus, parities in the failed drive are regenerated.

(Embodiment 6)

Figure 12:
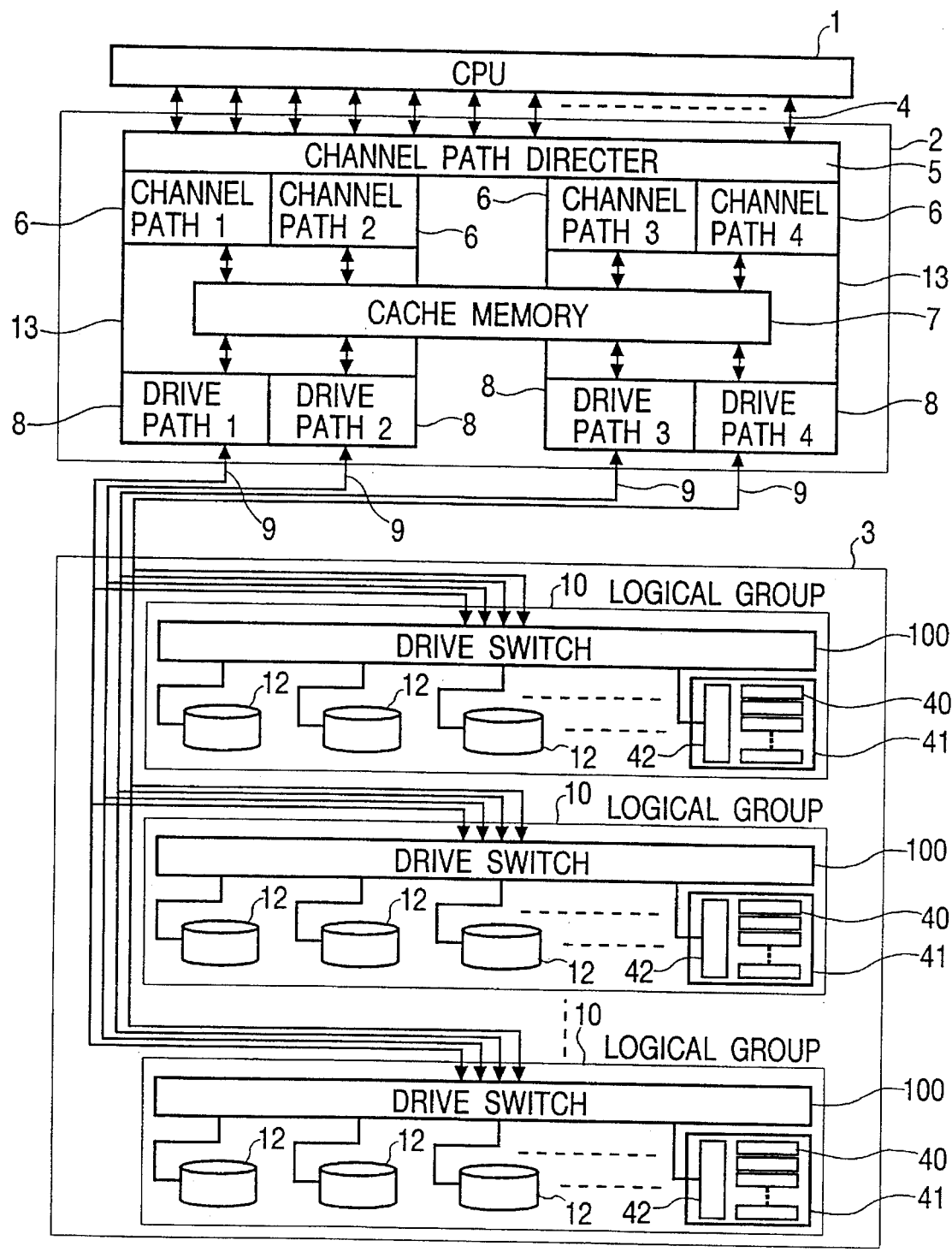
FIG. 12 is a schematic block diagram showing the hardware constitution in the embodiment 6.

FIG. 12 shows the hardware constitution of the present embodiment, the same symbols or reference numerals as those in FIG. 1 designate the same elements. The differences in the device shown in FIG. 12 from the device shown in FIG. 1 are: in place of a drive for holding parities, as shown in FIG. 1, a flash memory (FMEM) 41 is provided as a memory for holding parities in logical groups 10. The flash memory 41 is composed of a flash memory controller (FMEMC) 42 and a plurality of flash memory chips 40. In addition to this, in the present embodiment, in place of a parity drive No., P Drive No., and the Addr 35 in the address P SCSI in a drive, a flash memory No. and an Addr in the flash memory are used.

Only the different points between the present embodiment and the embodiment 1 will be explained.

In the present embodiment, the process of writing or reading data is the same as that in the embodiment 1. The collective-writing of parities in this embodiment differs from that in the embodiment 1 in that an erasing of the flash memory 41 is employed.

Before new parities are written collectively, and sequentially, into the flash memory 41, either of the microprocessors 20 examines the quantity of the new parities to be written, and erases the addresses corresponding to the examined quantity in the flash memory chips at one time in which invalid parities (P1, P3 and P2) are written. After that, similar to the embodiment 1, new parities are written collectively, and sequentially.

In the case of a flash memory, when new data is written into the flash memory, at first old data stored in the address at which new data is to be written is erased, and after the erase process is completed, the new data is actually written. In the case of a flash memory, it takes the same period of time to erase one sector (When a flash memory is accessed, the address of the same format is used as the address when a disk is accessed.) and to erase a plurality of sectors at one time. A greater part of a write time is occupied by an erase time, and an actual write time to a flash memory is negligibly small in comparison with the erase time. Owing to the sequential, collective writing, a characteristic of the present embodiment, an erase process can be completed at one time, so that the greater the number of collected new parities is, the smaller the overhead can be made.

(Embodiment 7)

In a device described in the embodiment 6, it is also possible to execute collective-writing of parities by the method shown in the embodiment 2.

In this case, similar to the embodiment 2, parities other than the parities to be updated are also read out from the flash memory 41, and together with the generated new parities they are written collectively to the memory. In the present embodiment, as opposed to the embodiment 2, in a period of time between the read out and the collective writing, an erase operation is executed at one time for the positions of old parities to be updated, which are stored in the flash memory, and for the positions in which the above-mentioned read out parities are held.

(Embodiment 8)

A flash memory, in comparison with a disk drive, has the merit that even if it is accessed at random, the access can be processed in a short time; on the other hand, the number of writing times has a limit. Therefore, if writing is concentrated to a single address, a part of the flash memory may reach the limit of the number of times it is capable of being written. After that, writing to the flash memory may become impossible.

In the present embodiment, in order to reduce the problem, when new parities are sequentially, collectively written to a plurality of flash memory chips 40 which constitute the flash memory 41, a chip to be written is changed in a regular order to average the number of times of writing to all flash memory chips 40.

Figure 13:
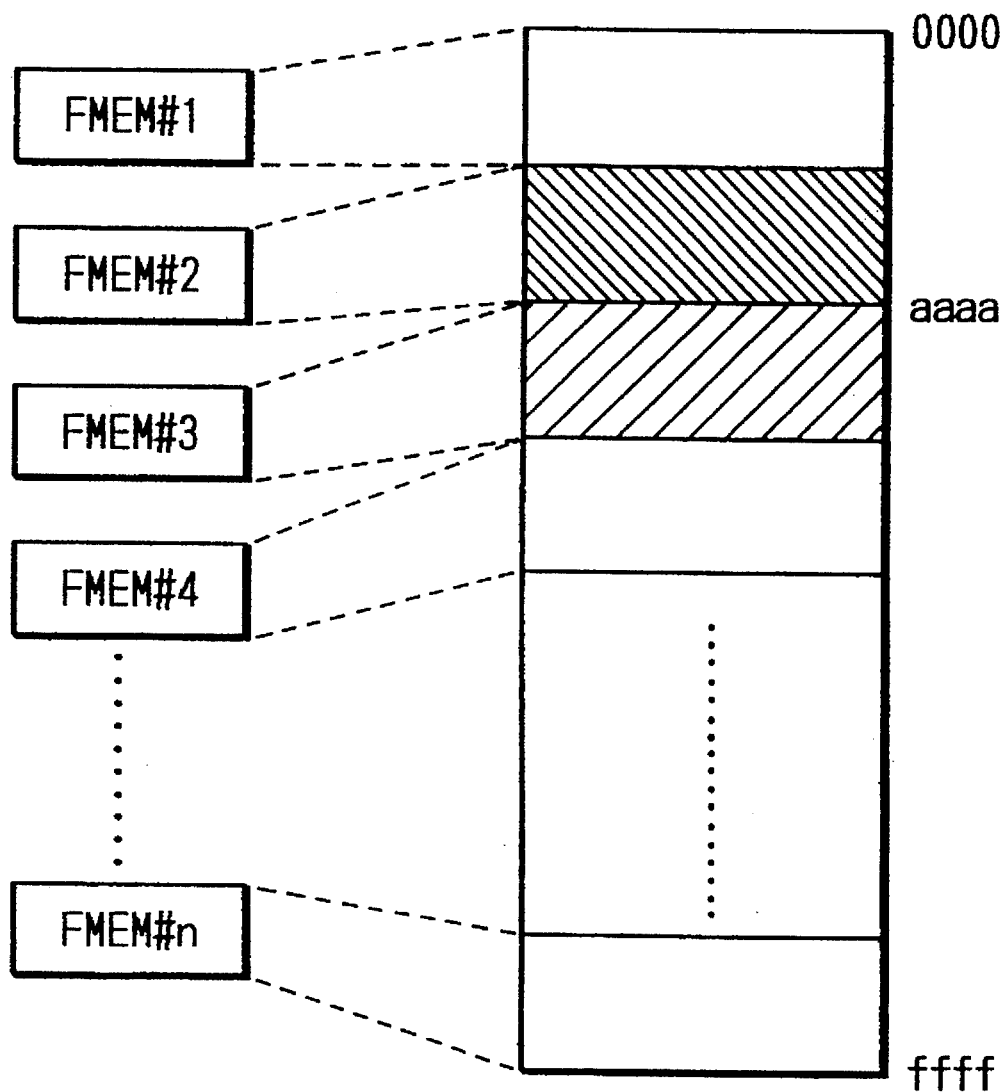
FIG. 13 is an illustrative diagram for explaining the address in the flash memory used in the embodiment 8.
Figure 15A:
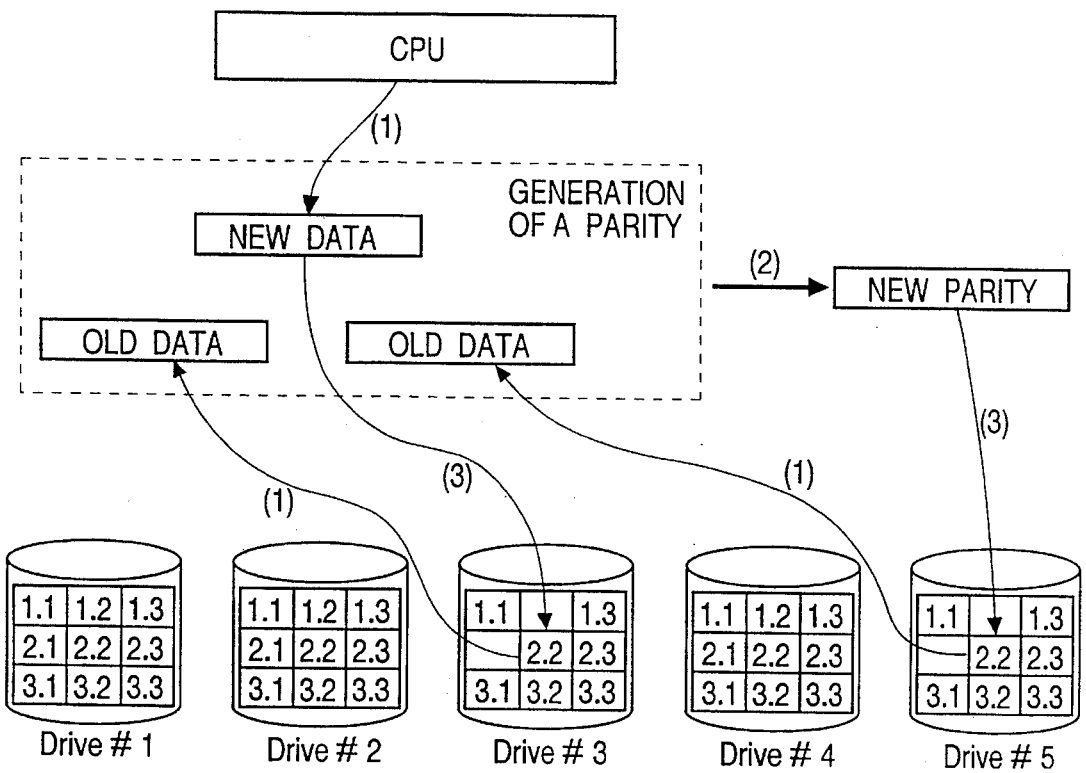
FIG. 15A is an illustrative diagram for explaining the procedure of a data updating process in a conventional level 4 disk array.
Figure 15B:
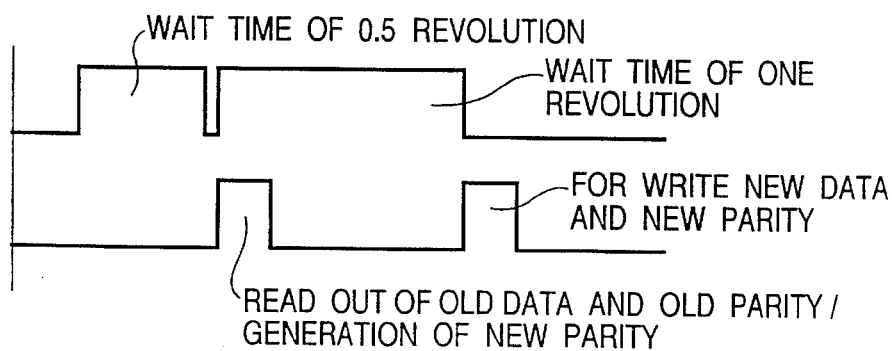
FIG. 15B is a time chart of a data updating process in a conventional level 4 disk array.

To be specific, as shown in FIG. 13, it is assumed that the flash memory 41 is composed of n pieces of flash memory chips, Nos. 1, 2, 3, 4, . . . , n, and addresses are from 0000 through ffff. When either of the microprocessor 20 recognizes that the sequential, collective-writing of new parities is to be performed, it examines the last address among the addresses in which new parities are stored, when the collective-writing was performed in the preceding writing times.

For example, in the collective-writing in the preceding times, assuming that new parities are written to the addresses from 0000 through aaaa in the flash memory 41, the microprocessor 20 stores the address aaaa. When the next sequential, collective-writing is to be performed, the microprocessor 20 examines the stored address (aaaa). As described above, if the microprocessor stores the last address used in the preceding writing times, it judges that the next sequential collective-writing of new parities is to be started from the address next to the address aaaa.

When the microprocessor 20 recognizes the head address of the sequential collective-writing of new parities as described above, in the next step, it judges if the number of times of writing to the flash memory 41 reaches the limit.

As shown in the judgment flowchart for the number of writing times in FIG. 14, the microprocessor 20 determines whether the head address of a sequential, collective-writing of new parities is 0000 (51). If it is not 0000, the judgment flow is finished (52), and if it is 0000, the microprocessor 20 adds 1 to the counter value of the number of writing times counter (53). In other words, every time a head address comes, the counter value is increased.

Next, the microprocessor 20 judges if the counter value plus 1 corresponds to the preset limiting value of the number of writing times for a flash memory chip 40 (54). The limiting value of the number of times of writing for a flash memory chips 40 is set by a user for the microprocessor 20 during initialization.

In the judgment result, when the number of writing times to the flash memory chip 40 does not exceed the limiting value, the judgment flow is finished (52), and when the number of writing times exceeds the limiting value, the microprocessor 20 indicates the need for flash memory chip (55).

As described above, in the present embodiment, sequential collective-writing is executed form a lower address to a higher address in one direction. Thereby, the numbers of writing times to all flash memory chips 40 in the flash memory 41 are averaged.

In the present embodiment, as described above, the numbers of writing times to the flash memory chips 40 in the flash memory 41 are averaged.

(Embodiment 9)

In the present embodiment, as shown in the embodiment 6, new parities are not sequentially, collectively written to the parity flahs memory chips for storing parities, but new parities are written to a plurality of flash memory chips 40 for storing parities in parallel. The present embodiment is constituted by applying the method shown in the embodiment 5 to the device shown in the embodiment 6; therefore, a detailed explanation thereof will be omitted.

What is claimed is:

1. A method of rewriting error correcting codes in a disc array device which includes a plurality of disc devices which hold a plurality of error correcting data groups, each of which includes a plurality of data and at least one error correcting code generated therefrom, the method comprising the steps of:

in response to a data rewrite request provided by an upper level device connected to said disc array device, reading old data designated by the data rewrite request from said plurality of disc devices;

reading, from said plurality of disc devices, an old error correcting code which belongs to one group within said plurality of error correcting data groups, to which one group the old data belongs;

generating a new error correcting code for the one error correcting data group, after the old data has been rewritten by new data designated by the data rewrite request, from the read old data, said old error correcting code and the new data;

rewriting the old data held in said plurality of disc devices by said new data;

temporarily holding the generated new error correcting code in a random access memory provided in said disc array device;

repeating said step of reading old data to said step of temporarily holding the new error correcting code for each of a plurality of other data rewrite requests subsequently provided by said upper level device, thereby storing a group of new error correcting codes for a group of data rewrite requests in said memory; and sequentially writing the group of new error correcting codes held in said memory into a group of storage locations within said plurality of disc devices, at which storage locations a group of old error correcting codes have been held, according to an order of access predetermined for storage locations within the disc devices;

wherein the order of access is predetermined so that a plurality of storage locations which belong to the same track within one of said disc devices are sequentially accessed according to an order of locations within the track.

2. A method of rewriting error correcting codes according to claim 1, wherein the order of access is predetermined so that a plurality of storage locations belonging to the same cylinder of one of said disc devices are accessed sequentially according to an order predetermined for tracks to which the plurality of storage locations belong, and so that a plurality of storage locations belonging to different cylinders of one of said disc devices are accessed sequentially according to an order predetermined for the cylinders.

3. A method of rewriting error correcting codes according to claim 1, wherein the group of new error correcting codes held in said memory are sequentially written into the group of storage locations according to an order of generation of corresponding ones of the group of data rewrite requests issued by said upper level device.

4. A method of rewriting error correcting codes according to claim 1, wherein the plurality of disc devices are divided into a plurality of data holding disc devices and at least one error correcting code holding disc device; and wherein the reading of the group of old error correcting codes and the writing of the group of new error correcting codes are carried out in said error correcting code holding disc device.

5. A method of rewriting error correcting codes according to claim 4, wherein the order of access is predetermined so that a plurality of storage locations belonging to the same cylinder of one of said disc devices are accessed sequentially according to an order predetermined for tracks to which the plurality of storage locations belong, and so that a plurality of storage locations belonging to different cylinders of one of said disc devices are accessed sequentially according to an order predetermined for the cylinders.

6. A method of rewriting error correcting codes according to claim 4, wherein the group of new error correcting codes held in said memory are sequentially written into the group of storage locations according to an order of generation of corresponding ones of the group of data rewrite requests issued by said upper level device.

7. A method of rewriting error correcting codes according to claim 4, wherein said error correcting code holding disc device includes a plurality of areas;

wherein the group of new error correcting codes are held in said memory as a plurality of new error correcting code partial groups, each partial group corresponding to one of said areas and each partial group including plural new error correcting codes which correspond to plural old error correcting codes held at plural storage locations, each of which belong to the same one of said areas;

wherein the step of sequentially writing the group of new error correcting codes is executed, so that new error correcting codes belonging to different error correcting code partial groups are sequentially written, and so that new error correcting codes belonging to each partial group are written sequentially, according to said order of access, into a group of storage locations which belong to one of said areas corresponding to each partial group, and at which storage locations a plurality of old error correcting codes corresponding to a plurality of new error correcting codes belonging to each partial group are held.

8. A method of rewriting error correcting codes according to claim 7, wherein the order of access is predetermined so that a plurality of storage locations belonging to the same cylinder within one of said areas within said error correcting code holding disc device are accessed sequentially according to an order predetermined for tracks to which the plurality of storage locations belong, and so that a plurality of storage locations belonging to different cylinders within said one area are accessed sequentially according to an order predetermined for the cylinders.

9. A method of rewriting error correcting codes according to claim 7, wherein the step of sequentially writing the group of new error correcting codes is executed so that a plurality of new error correcting codes belonging to each partial group and held in said memory are sequentially written into a group of storage locations within one of said areas corresponding to each partial area, according to an order of generation of corresponding ones of a group of data rewrite requests issued by said upper level device.

10. A method of rewriting error correcting codes according to claim 1, wherein the plurality of disc devices include a plurality of error correcting code holding areas provided in different ones of said disc devices;

wherein the group of new error correcting codes are held in said memory as a plurality of new error correcting code partial groups, each partial group corresponding to one of said areas and each partial group including plural new error correcting codes which correspond to plural old error correcting codes held at plural storage locations, each of which belong to the same one of said areas;

wherein the step of sequentially writing the group of new error correcting codes is executed so that new error correcting codes belonging to different error correcting code partial groups are sequentially written, and so that new error correcting codes belonging to each partial group are written sequentially, according to said order of access, into a group of storage locations which belong to one of said areas corresponding to each partial group, and at which storage locations a plurality of old error correcting codes corresponding to a plurality of new error correcting codes belonging to each partial group are held.

11. A method of rewriting error correcting codes according to claim 10, wherein the order of access is predetermined so that a plurality of storage locations belonging to the same cylinder within one of said areas within one of said disc devices are accessed sequentially according to an order predetermined for tracks to which the plurality of storage locations belong, and so that a plurality of storage locations belonging to different cylinders within said one area are accessed sequentially according to an order predetermined for the cylinders.

12. A method of rewriting error correcting codes according to claim 7, wherein a plurality of new error correcting codes belonging to each partial group and held in said memory are sequentially written into a group of storage locations within one of said areas corresponding to each partial area, according to an order of generation of corresponding ones of a group of data rewrite requests issued by said upper level device.

13. A method of rewriting error correcting codes according to claim 1, further comprising:

reading, from said plurality of disc devices to said memory, error correcting codes other than a group of old error correcting codes corresponding to the group of new error correcting codes held in said memory, after the repeating step;

wherein the step of sequentially writing the group of new error correcting codes is executed so that the group of new error correcting codes and said read other error correcting codes are sequentially written into a group of storage locations of said plurality of disc devices according to the order of access.

14. A method of rewriting error correcting codes according to claim 13, wherein each of the storage locations is one which holds either one of the group of new error correcting codes or one of the other group of error correcting codes.

15. A method of rewriting error correcting codes according to claim 4, further comprising:

reading, from said error correcting code holding disc device to said memory, error correcting codes other than a group of old error correcting codes corresponding to the group of new error correcting codes held in said memory, after the repeating step;

wherein the step of sequentially writing the group of new error correcting codes is executed so that the group of new error correcting codes and said read other error correcting codes are sequentially written into a group of storage locations of said error correcting code holding disc devices according to the order of access.

16. A method of rewriting error correcting codes according to claim 15, wherein each of the storage locations is one which holds either one of the group of new error correcting codes or one of the other group of error correcting codes.

17. A method of rewriting error correcting codes according to claim 7, further comprising:

reading, from each of the areas of said error correcting code holding disc device to said memory, error correcting codes other than a group of old error correcting codes corresponding to the partial group of new error correcting codes held in said memory in correspondence to said each area, after the repeating step;

wherein the step of sequentially writing the group of new error correcting codes is executed so that the partial group of new error correcting codes and said read other error correcting codes held in said memory in correspondence to each area are sequentially written into storage locations within each area of said error correcting code holding disc device according to the order of access, wherein each of the storage locations within each area is one which holds either one of the partial group of new error correcting codes for each area or one of the other group of error correcting codes for each area.

18. A method of rewriting error correcting codes according to claim 10, further comprising:

reading, from each of the error correcting code holding areas within said plurality of disc devices to said memory, error correcting codes other than a group of old error correcting codes corresponding to the group of new error correcting codes held in said memory in correspondence to each error correcting code holding area, after the repeating step;

wherein the step of sequentially writing the group of new error correcting codes is executed so that the group of new error correcting codes for each error correcting code holding area and said read other error correcting codes held in said memory in correspondence to each error correcting code holding area are sequentially written into storage locations within each error correcting code holding area, according to the order of access, wherein each of the storage locations within each area is one which holds either one of the group of new error correcting codes for each error correcting code holding area or one of the other group of error correcting codes for each error correcting code holding area.

19. A method of recovering error correcting codes according to claim 4, further comprising the steps of:

reading a plurality of error correcting codes from said error correcting code holding disc, at the occurrence of a fault during accessing of one of said plurality of data holding disc devices;

sequentially reading a plurality of groups of data from others of said data holding discs, other than said one faulty data holding disc, each group of data comprising data belonging to the same error correcting data group and being held at mutually the same address within said other data holding disc devices, said groups being read sequentially group by group;

selecting, from said plurality of error correcting codes as read, an error correcting code which should belong to the same error correcting data group as one to which each group within said groups of data as read belongs; and recovering, for each group of data, data held in said faulty disc device and belonging to the same error correcting data group, from said error correcting code selected for each group and said read group of data.

20. A method of recovering error correcting codes according to claim 4, wherein said disc array device further includes;

a plurality of other disc devices including a plurality of other data holding disc devices and at least one other error correcting code holding disc device for said other data holding devices; and a common error correcting code holding disc device provided for said plurality of disc devices and said plurality of other disc devices;

wherein the method further comprises the steps of:

in response to another group of data rewrite requests provided by said upper level device, executing the step of reading old data to said step of sequentially writing a plurality of old data and a plurality of new data, both related to said another group of data rewrite requests and held in said plurality of other disc devices, thereby generating another group of new error correcting codes for said plurality of other disc devices, and sequentially writing the generated another group of new error correcting codes into said other error correcting code holding disc device;

generating a still other group of new error correcting codes from the group of new error correcting codes generated for said plurality of disc devices and from said another group of new error correcting codes generated for said plurality of other disc devices;

writing the generated still other group of error correcting codes into said common error correcting code holding disc device;

sequentially reading a group of error correcting codes from one of said error correcting code holding disc device and said other error correcting code holding disc device, at the occurrence of fault with another one of said error correcting code holding disc device and said other error correcting code holding disc device;

sequentially reading said still other group of error correcting codes from said common error correcting code holding disc device; and recovering a group of error correcting codes held in said faulty error correcting code holding disc device, from said group of error correcting codes read from said one error correcting code holding device and said still other group of error correcting codes read from said common error correcting code holding device.

21. A method of rewriting error correcting codes in a disc array device which includes a plurality of data holding disc devices and holds a plurality of error correcting data groups, each of which includes a plurality of data and at least one error correcting code generated therefrom, the method comprising the steps of:

in response to a data rewrite request provided by an upper level device connected to said disc array device, reading old data designated by the data rewrite request from one of said plurality of disc devices;

reading an old error correcting code which belongs to one group within said plurality of error correcting data groups to which one group the old data belongs, from a flash memory provided in said disc array device;

generating a new error correcting code for the one error correcting data group, after the old data has been rewritten by new data designated by the data rewrite request, from the read old data, said old error correcting code and the new data;

rewriting the old data held in said one disc device by said new data;

temporarily holding the generated new error correcting code in a random access memory provided in said disc array device;

repeating said step of reading old data to said step of holding a new error correcting code for each of a plurality of other data rewrite requests subsequently provided by said upper level device, thereby storing a group of new error correcting codes for a group of data rewrite requests into said random access memory;

erasing a group of old error correcting codes which correspond to said group of new error correcting codes from a group of storage locations within said flash memory, after the repeating step; and sequentially writing the group of new error correcting codes held in said random access memory into the group of storage locations within said flash memory according to an order of access predetermined for storage locations within said flash memory.

22. A method of rewriting error correcting codes according to claim 21, wherein the group of new error correcting codes held in said random access memory are sequentially written into the group of storage locations according to an order of generation of corresponding ones of the group of data rewrite requests issued by said upper level device.

23. A method of rewriting error correcting codes according to claim 21, wherein said flash memory includes a plurality of areas;

wherein the group of new error correcting codes are held in said random access memory as a plurality of new error correcting code partial groups, each partial group corresponding to one of said areas and each partial group including plural new error correcting codes which correspond to plural old error correcting codes held at plural storage locations each of which belong to the same one of the areas;

wherein the step of sequentially writing the group of new error correcting codes is executed so that error correcting codes belonging to different error correcting code partial groups are written sequentially, and so that new error correcting codes belonging to each partial group are written sequentially, according to said order of access, into a group of storage locations which belong to one of said areas corresponding to each partial group and at which storage locations a plurality of old error correcting codes corresponding to a plurality of new error correcting codes belonging to each partial group are held.

24. A method of rewriting an error correcting codes according to claim 21, further comprising:

reading, from said flash memory to said random access memory, error correcting codes other than a group of old error correcting codes corresponding to the group of new error correcting codes held in said random access memory, after the repeating step; and erasing the group of old error correcting codes and said other error correcting codes from said flash memory, after the reading of the latter;

wherein the step of sequentially writing the group of new error correcting codes is executed so that the group of new error correcting codes and said read other error correcting codes are sequentially written into a group of storage locations of said flash memory according to the order of access.

25. A method of rewriting error correcting codes in a disc array device which includes a plurality of data holding disc devices and which holds a plurality of error correcting data groups, each of which includes a plurality of data and at least one error correcting code generated therefrom, the method comprising the steps of:

in response to a data rewrite request provided by an upper level device connected to said disc array device, reading old data designated by the data rewrite request from one of said plurality of devices;

reading an old error correcting code which belongs to one group within said plurality of error correcting data groups, to which one group the old data belongs, from a flash memory provided in said disc array device;

generating a new error correcting code for the one error correcting data group after the old data has been rewritten by new data designated by the data rewrite request, from the read old data, said old error correcting code and the new data;

rewriting the old data held in said one disc device by said new data;

temporarily holding the generated new error correcting code in a random access memory provided in said disc array device;

repeating said step of reading old data to said step of temporarily holding the generated new error correcting code for each of a plurality of other data rewrite requests subsequentially provided by said upper level device, thereby storing a group of new error correcting codes for a group of data rewrite requests into said random access memory; and executing an erasing operation, after the repeating step, to a group of storage locations within said flash memory which have successive addresses and hold invalid information;

sequentially writing the group of new error correcting codes held in said random access memory into the group of storage locations according to a predetermined order of addresses; and repeating the step of reading old data to the step of sequentially writing the group of new error correcting codes into said flash memory for different groups of data rewrite requests provided by said upper level device;

wherein one group within different groups of storage locations within said flash memory which have successive addresses and which hold invalid information is selected from said flash memory at the writing of a group of new error correcting codes generated for each group within the other groups of data rewrite requests during the last mentioned repetition.

26. A disc array device, comprising:

a plurality of disc devices which hold a plurality of error correcting data groups, each of which includes a plurality of data and at least one error correcting code generated therefrom;

a disc array controller connected to said plurality of disc devices and an upper level device, said disc array controller including a random access memory and a control device;

said control device including:

means responsive to a data rewrite request provided by said upper level device for reading old data designated by the data rewrite request from said plurality of disc devices;

means for reading, from said plurality of disc devices, an old error correcting code which belongs to one group within said plurality of error correcting data groups to which one group the old data belongs;

means for generating a new error correcting code for the one error correcting data group, after the old data has been rewritten by new data designated by the data rewrite request, from the read old data, said old error correcting code and the new data;

means for rewriting the old data held in said plurality of disc devices by said new data;

means for writing the generated new error correcting code into the random access memory;

means for repetitively operating said first mentioned reading means to said last mentioned writing means for each of a plurality of other data rewrite requests subsequently provided by said upper device, thereby storing a group of new error correcting codes for a group of data rewrite requests in said random access memory; and means for sequentially writing the group of new error correcting codes held in said random access memory into a group of storage locations within said plurality of disc devices, at which storage locations a group of old error correcting codes have been held, according to an order of access predetermined for storage locations within said disc devices;

wherein the order of access is predetermined so that a plurality of storage locations which belong to the same track within one of said disc devices are sequentially accessed according to an order of locations within the track.

27. A disc array device, comprising:

a plurality of data holding disc devices which hold a plurality data belonging to a plurality of error correcting data groups each of which includes a plurality of data and at least one error correcting code generated therefrom;

a flash memory for holding a plurality of error correcting codes for the plurality of error correcting data groups; and a disc array controller connected to said plurality of disc devices, said flash memory and an upper device, said disc array controller including a random access memory and a control device;

said control device including:

means responsive to a data rewrite request provided by said upper device for reading old data designated by the data rewrite request from said plurality of disc devices;

means for reading from said flash memory an old error correcting code which belongs to one group within said plurality of error correcting data groups to which one group the old data belongs;

means for generating a new error correcting code for the one error correcting data group after the old data has been rewritten by new data designated by the data rewrite request, from the read old data, said old error correcting code and the new data;

means for rewriting the old data held in said plurality of disc device by said new data;

means for writing the generated new error correcting code into the random access memory;

means for repetitively operating said first mentioned reading means to mentioned writing means for each said last of a plurality of other data rewrite requests subsequently provided by said upper level device, thereby storing a group of new error correcting codes for a group of data rewrite requests in said random access memory;

means for erasing a group of storage locations within said flash memory which hold a group of old error correcting codes corresponding to the group of new error correcting codes held in said random access memory; and means for sequentially writing the group of new error correcting codes held in said random access memory into the group of storage locations within said flash memory, according to an order of access predetermined for storage locations within said flash memory.

* * * * *